US012276932B2

(12) United States Patent
Alexandrovich et al.

(10) Patent No.: US 12,276,932 B2

(45) Date of Patent: Apr. 15, 2025

(54) ELECTROPHOTOGRAPHIC METHOD FOR PROVIDING FOIL IMAGES

(71) Applicant: Eastman Kodak Company, Rochester, NY (US)

(72) Inventors: Peter S. Alexandrovich, Rochester, NY (US); Diego A. Diaz, McKinney, TX (US); David F. Cahill, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 65 days.

(21) Appl. No.: 17/948,394

(22) Filed: Sep. 20, 2022

(65) Prior Publication Data

US 2023/0107991 A1 Apr. 6, 2023

Related U.S. Application Data

(60) Provisional application No. 63/252,254, filed on Oct. 5, 2021.

(51) Int. Cl.
*G03G 15/00* (2006.01)

(52) U.S. Cl.
CPC ..... *G03G 15/6582* (2013.01); *G03G 15/6585* (2013.01); *G03G 2215/00801* (2013.01)

(58) Field of Classification Search
CPC ........... G03G 15/6585; G03G 15/6582; G03G 2215/00801
See application file for complete search history.

(56) References Cited

U.S. PATENT DOCUMENTS 5,520,763 A 5/1996 Johnstone
6,223,799 B1 5/2001 Johnstone
(Continued)

FOREIGN PATENT DOCUMENTS

JP 2013022891 A 2/2013
JP 2013195909 A 9/2013
(Continued)

*Primary Examiner* — Jennifer Bahls

(74) *Attorney, Agent, or Firm* — J. Lanny Tucker

(57) ABSTRACT

Foil images are formed simultaneously with color toner images on a receiver material. One or more color toner latent images are formed on the receiver material using dry color toners. Each dry color toner has a (a) polymeric resin, a (b) pigment colorant, and a (c) wax that has a melting temperature defined as $T_{color}$. A foiling latent image is formed using a dry foiling toner that has a (a') polymeric resin and a (c') wax that has a melting temperature defined as $T_{foiling}$. The foiling latent image is in an area that is different from the color image areas and $T_{foiling}$ is less than $T_{color}$ by at least 15° C. All toners are simultaneously fixed in a fuser oil-free fixing operation. A printing foil can be brought into intimate contact with the fused foiling toner at a foiling temperature (FT) that is greater than $T_{foiling}$ but less than $T_{color}$.

18 Claims, 4 Drawing Sheets

(56) References Cited

U.S. PATENT DOCUMENTS

| | | | |
|---|---|---|---|
| 6,605,174 | B1 | 8/2003 | Landa et al. |
| 6,977,101 | B2 | 12/2005 | Landa et al. |
| 8,530,122 | B2 | 9/2013 | Uchino et al. |
| 8,632,934 | B2 | 1/2014 | Shirai et al. |
| 8,652,742 | B2 | 2/2014 | Matsushima et al. |
| 8,750,770 | B2 | 6/2014 | Fujita et al. |
| 8,927,094 | B2 | 1/2015 | Sugai |
| 8,993,208 | B2 | 3/2015 | Matsushima et al. |
| 9,034,553 | B2 | 5/2015 | Hiramoto et al. |
| 9,037,065 | B2 | 5/2015 | Suzuki |
| 9,081,332 | B2 | 7/2015 | Suzuki |
| 9,182,690 | B1 | 11/2015 | Alexandrovich et al. |
| 9,261,808 | B2 | 2/2016 | Tyagi et al. |
| 9,791,601 | B2 | 10/2017 | Choi et al. |
| 9,857,717 | B2 | 1/2018 | Ron et al. |
| 10,042,308 | B2 | 8/2018 | Ron et al. |
| 10,197,949 | B2 | 2/2019 | Ron et al. |
| 10,313,563 | B2 | 6/2019 | Tswkano |
| 10,618,258 | B2 | 4/2020 | Cohen et al. |
| 10,682,837 | B2 | 6/2020 | Martinez de Leon et al. |
| 10,721,369 | B2 | 7/2020 | Kawasaki |
| 10,775,731 | B2 | 9/2020 | Kakishima et al. |
| 10,795,313 | B2 | 10/2020 | Sakai et al. |
| 10,845,749 | B2 | 11/2020 | Sato et al. |
| 2010/0212821 | A1 | 8/2010 | Grinberg et al. |
| 2012/0264045 | A1 | 10/2012 | Matsushima et al. |
| 2018/0093468 | A1 | 4/2018 | Sasami |
| 2020/0073326 | A1* | 3/2020 | Sakai ..................... G03G 21/20 |
| 2020/0201235 | A1* | 6/2020 | Konno ............... G03G 15/6591 |
| 2020/0233363 | A1 | 7/2020 | Sato et al. |
| 2021/0008921 | A1 | 1/2021 | Sakai et al. |
| 2021/0197609 | A1 | 7/2021 | Tsai et al. |

FOREIGN PATENT DOCUMENTS

| | | | |
|---|---|---|---|
| JP | 2013222185 | A | 10/2013 |
| JP | 2014010302 | A | 1/2014 |
| JP | 2020122903 | A | 8/2020 |

* cited by examiner

ELECTROPHOTOGRAPHIC METHOD FOR PROVIDING FOIL IMAGES

RELATED APPLICATION

This application has priority from U.S. Ser. No. 63/252,254 filed Oct. 5, 2021, by Alexandrovich, Diaz, and Cahill.

FIELD OF THE INVENTION

This invention relates to electrophotography in which color images are provided on substrates (receiver materials) using particulate dry color toners, and on which substrates one or more foil images are also provided in selected areas. Thus, this invention relates to forming foil images in selected areas of a receiver material also having one or more color toner images. The particulate toners used to form the color toner images and the foil images are designed with different melting temperatures to facilitate oil-free fusing and foiling operations.

BACKGROUND OF THE INVENTION

In foil printing, a colored foil that is releasably bonded to a backing material that can be known as a "foil backing" is transferred from the backing material to a substrate to form one or more foil images on a substrate. Such colored foil and its backing material can be known in the art as a "printing foil." In foil printing on a substrate such as a paper, generally the paper is printed with a desired image using conventional printing means (for example, a printing press or inkjet printer), and conventional printing inks or inkjet printer inks.

U.S. Pat. No. 6,605,174 (Landa et al.) refers to a "foiling adhesive" that is used in those areas to which it is desired to transfer foil to provide foil images. The demonstrated foiling adhesive is a liquid toner material that is composed of certain vinyl polymers or a polyamide. Dry toners are also mentioned in this publication for the same purpose. This foiling adhesive is printed using a xerographic (or electrophotographic) process in which the foiling adhesive is bonded to a paper or other substrate by fixing (or fusing). A printing foil of a desired color and luster can be pressed to the paper in the regions of the foiling adhesive and heated and the heating causes the foiling adhesive to melt and become tacky. Other printed inks however can be designed to be unaffected by the heat and pressure and thus, the foil adheres only to the tacky regions of foiling adhesive. When the backing material is removed, the foil is detached therefrom and adhered only in the regions designed with the foiling adhesive. Foils are generally metallic but can be of any color, and are often used for special printing effects such as for printing gold or silver color details on a business card, greeting card, or other receiver material.

As hinted above, one common method for printing color images on a receiver material is known as electrophotography, in which a latent electrostatic image of one or more colors can be formed on a dielectric photoconductive material (sometimes called a photoreceptor or an intermediate receiver material) by uniformly charging the photoconductive material, followed by discharging selected areas of the uniform charge to yield an electrostatic pattern corresponding to the desired image ("latent electrostatic image"). After the formation of such latent electrostatic image, charged toner particles are brought into the vicinity of the latent electrostatic image to develop the latent image into a visible image. After this development, a suitable receiver material is brought into juxtaposition with the visible image and a suitable electric field is applied to transfer the toner particles of the visible image to a "final" receiver material to form a desired "printed" image on the receiver material that can be for example a cut sheet of cellulosic paper or polymeric film. There can optionally be an intermediate transfer member to which the developed image on the photoreceptor is transferred, and from which the toner image is then transferred to the receiver material.

The receiver material is then removed from its operative association with the dielectric photoconductive material and is subjected to suitable heat and pressure to permanently fix (or fuse) the printed image in the receiver material. Such fused toner image can be monochrome or multi-colored or be in the form of a composite of multiple overlaid colors in the same or different areas of the toner image. Typical multicolor toner images often prepared using cyan (C), magenta (M), yellow (Y), and black (K) toners containing appropriate colorants such as pigment colorants to provide the desired colors or tones. Other colors can also be fashioned using one or more differently colored toners.

Consumers of traditional images prepared using colored toners and consumers looking for foil images have generally used separated processes to obtain each type of image. As noted above, U.S. Pat. No. 6,605,174 suggests that xerography (or electrophotography) may be used to provide foil images using a dry or liquid foiling toner adhesive as a means to adhere foil in desired areas while conventional printing inks can be used to provide traditional colored images.

For a number of years, Eastman Kodak Company has developed and marketed electrophotographic printing presses and printing processes in which one or more colorless toner images or color toner images are provided on receiver materials from one or more toner printing modules, wherein each toner printing module contains an appropriate dry color toner or dry colorless toner for a given electrophotographic printing operation.

There is a desire to provide foil images on the same receiver material that has printed color toner images. It has seemed from the art that such operations can be achieved only using consecutive operations in which foiling toner images are provided on a receiver material in one pass in one machine, and then foiled on a second machine (such as a Sleeking™ press for example a GMP Foil Laminator using a commercial multistep Sleeking™ process; Sleeking™ appears to be a trademark of GMP Ltd.). The same surface of the receiver material having the foil images so prepared is then printed with a desired printed color image on the same machine first used to apply the foiling toner, or on a second separate electrophotographic printing device resulting in the final printed receiver material. As such, the commercial Sleeking™ process is a two- or multistep procedure. In either process, registration of foil images and color toner images becomes a significant challenge. For example, such a process results in dimensional changes of the receiver material due both to the removal of moisture and to stresses applied in the heated nip when the foiling toner is fused, as well as the same factors in the lamination step for the desired transfer of foil components.

There is a desire to solve such registration problems for example, by fusing both the foiling toner and color toners simultaneously. Thus, there is a desire to simplify the operations used to provide foil images combined with color toner images in a manner that provide essentially perfect image registration and high-speed imaging. While U.S. Pat. No. 6,605,174 (noted above) seems to suggest that this is possible, it fails to teach viable methods and equipment to achieve this result. The patent merely suggests a desired result using known components but it fails to teach how a process or apparatus or both can be designed to achieve the desired result. Thus, its teaching is merely speculative and not enabling a skilled worker to solve the registration problem.

Moreover, it has been found that when conventional color toner images are provided using conventional electrophotographic equipment such as a NEXPRESS SX3900 printer (Eastman Kodak Company) and known fusing operations in the presence of a conventional fuser oil, it is difficult to apply foil images. The fuser oil appears to hinder transfer of foil to the receiver material even though it is often desirable to use such fuser oil with conventional color toner transfer.

While U.S. Pat. No. 6,605,174 (noted above) promotes the use of liquid toners to provide both color images and adhesives for foil applications, there are serious reasons why one skilled in the art would want to avoid the use of liquid toners in such operations. Liquid toners comprise organic solvents (or carrier fluids or carrier liquids) that must be removed before or during fusing onto a receiver material. Removing such solvents from color images would be necessary before foil images are formed, and this would slow down or impair the overall process to such an extent that the process would lack commercial efficiency and viability. Perhaps that is why U.S. Pat. No. 6,605,174 (noted above) does not appear to actually demonstrate the described process using liquid toners.

Thus, there is a need for an electrophotographic process in which both color toner images and foil images can be formed on the same receiver material without the use of fuser oils and in perfect image registration on the same electrophotographic printing machine. It is also desired to accomplish these advantages without the use of liquid toners so that the process can be high-speed and commercially viable.

SUMMARY OF THE INVENTION

The present invention provides a method for providing a foil image on a receiver material without inkjet printing, the method comprising the following A) through D):

A) providing one or more color toner latent images in one or more color image areas on a surface of a receiver material, using corresponding one or more dry color toners, each corresponding dry color toner comprising dry toner particles comprising: a (a) polymeric resin, a (b) pigment colorant, and a (c) wax that has a melting temperature defined as $T_{color}$;

B) simultaneously with or subsequently to A), providing one or more foiling toner latent images in one or more foiling image areas on the surface of the receiving material, using a dry foiling toner comprising dry foiling toner particles comprising: a (a') polymeric resin and a (c') wax that has a melting temperature defined as $T_{foiling}$, wherein the one or more foiling image areas are different from the one or more color image areas, and $T_{foiling}$ is less than $T_{color}$ by at least 15° C.;

C) simultaneously fixing the one or more color toner latent images and the one or more foiling toner latent images on the surface of the receiving material, in a fuser oil-free fusing operation, to provide one or more corresponding fused color toner images and one or more corresponding fused foiling toner images; and D) forming one or more foil images in the one or more foiling image areas and not in the one or more color image areas, by bringing a printing foil into intimate contact with the one or more corresponding fused foiling toner images at a foiling temperature (FT) that is greater than $T_{foiling}$ but less than $T_{color}$.

In some embodiments, the present invention provides an electrophotographic imaging method for providing an article having one or more foil images using toner latent images, the method comprising the following A') through E'):

A') developing one or more color toner latent images in one or more color image areas using corresponding dry color toners, to form a composite color toner image on an intermediate receiver material, each corresponding dry color toner comprising dry toner particles comprising: a (a) polymeric resin, a (b) pigment colorant, and a (c) wax that has a melting temperature defined as $T_{color}$;

B') simultaneously with or subsequently to A), developing one or more foiling toner latent images in one or more foiling image areas to provide one or more foiling toner images on the intermediate receiver material, using a dry foiling toner comprising dry foiling toner particles comprising: a (a') polymeric resin and a (c') wax that has a melting temperature defined as $T_{foiling}$, wherein the one or more foiling image areas are different from the one or more color image areas, and $T_{foiling}$ is less than $T_{color}$ by at least 15° C.;

C') transferring the composite color toner image and the one or more foiling toner images from the intermediate receiver material to a receiver material;

D') simultaneously fixing the transferred composite color toner image and the transferred one or more foiling toner images in a fuser oil-free fusing operation, to provide a corresponding fixed composite color toner image and one or more corresponding fixed foiling toner images; and E') forming one or more foil images in the one or more foiling toner images and not in the one or more color image areas, by bringing a printing foil into intimate contact with the one or more corresponding fixed foiling toner images at a foiling temperature (FT) that is greater than $T_{foiling}$ but less than $T_{color}$, to provide an article with one or more foil images and a composite color toner image.

The method of this invention provides the following advantages compared to methods of the prior art used to provide foil images.

An important feature of the present inventive process is that it provides the ability to fuse both a dry foiling toner and dry color toners simultaneously, in their respective image areas, thus completely avoiding the problem described above where poor registration of the foil and color images occurs. When the prior art process of first producing a foiling toner image, secondly heat transferring the foil, and thirdly forming the color image is carried out, dimensional changes of the receiver material occur due to both the removal of moisture and to stresses applied in the heated nip when the first step fusing of the dry foiling toner is accomplished. When this image is then foiled and put back into the printing device for the third step of adding color image(s), the exact dimensions of the receiver material have changed, causing the color image areas to be misregistered with the foiled image areas.

Another advantage of the present invention is that not requiring the receiver material already having foil images to be further printed with a color image is desirable for all dry color toner based printers because later electrostatic transfer of the dry color toners causes those dry color toners to be disrupted by the presence of the electrically conductive foil images on the receiver.

In addition, the present invention avoids the use of liquid toners and the various technical problems in handling and use they cause. Specific to foil transfer, it is known that residual liquid toner solvent in a liquid toner image inhibits the transfer of the printing foil, and thus the solvent level in such images must be reduced enough so that the foil transfer step can be achieved. This causes a large delay in the production process of producing foiled and color toner images.

DETAILED DESCRIPTION OF THE INVENTION

Definitions

Figure 1:
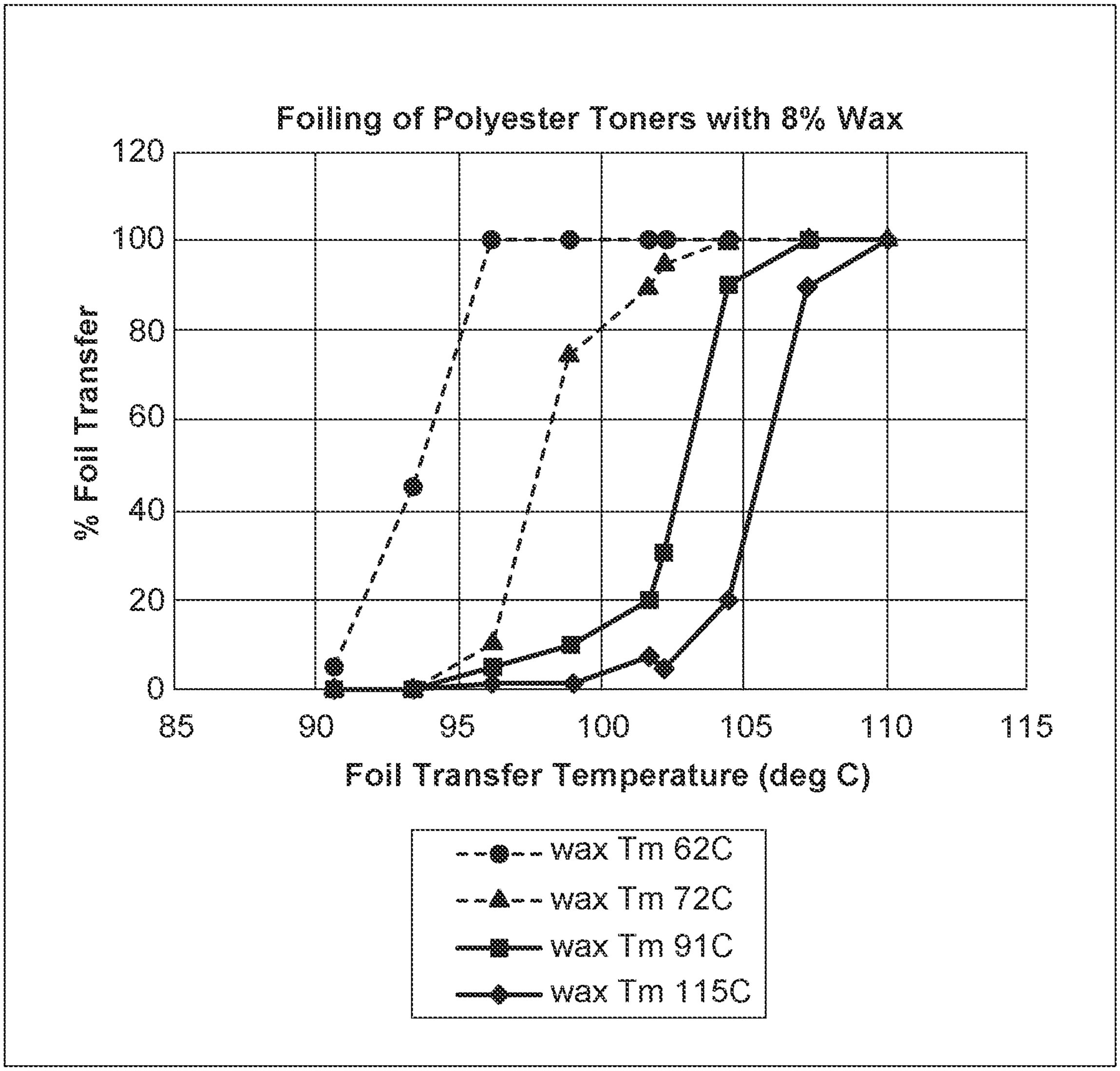
FIG. 1 is a graphical representation of data obtained according to Example 1 below, that is, % foil transfer versus foil transfer temperature at a particular amount of (c) wax in the several dry black toners.

As used herein to define various components of the toner particles, opacifying layers, and underlying layers, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values, and unless otherwise indicated, the range end points as well.

Concentrations, amounts, and other numerical data may be expressed or presented herein in a range format, or in multiple ranges. It is to be understood, unless otherwise indicated, that such range format is used primarily for convenience and brevity and thus should be interpreted flexibly to include not just the numerical values explicitly recited as the limits of the ranges, but also to include all of the individual numerical values or sub-ranges encompassed within the stated range as if each numerical value and sub-range was explicitly recited.

As used herein and unless otherwise indicated, the term "weight %" (or wt. %) is to be taken as referring to a weight-for-weight (w/w) percentage of solids in the a given composition, formulation, or wet or dry layer or image.

As used herein, the terms "electrostatic printing" and "electrophotographic printing" generally refer to the process that provides a toner image that is transferred from a photoimaging substrate either directly or indirectly via an intermediate transfer member (or an intermediate receiver material) to a receiver material. As used herein, the toner image or foiling image is not substantially absorbed into the photoimaging substrate (or receiver material) on which it is applied.

In addition, "electrophotographic printers" and "electrostatic printers" generally refer to those apparatus or printers that are capable of performing electrophotographic printing or electrostatic printing, as described herein.

The present invention is directed to the use of "dry" powder toners (as defined below) and does not include the use of what are known in the art as "liquid" toners comprising a carrier liquid or carrier fluid.

Unless otherwise indicated, the terms "fixing" and "fusing" in reference to dry color toners and foiling toners are intended to refer to the same operation of melting the dry toner particles as known in the art.

The terms "particle size," "size," and "sized" as used herein in reference to either the dry color toner particles or foiling toner particles are defined in terms of the median volume diameter ($D_{vol}$) as measured using conventional diameter measuring devices such as a Coulter Multisizer (Coulter, Inc.). The size in a distribution of particles at which half of the total volume of particles is larger, and half of the total volume is smaller is known as the median volume diameter.

As used herein, the term "dry toner" is used to refer to a material or mixture that contains dry toner particles, typically in powder form, and that can form an image, pattern, or coating when deposited on an imaging member including a photoreceptor, photoconductor, or electrostatically-charged or magnetic surface. Toner can be referred to in the art as "marking particles," "dry ink," or "developer," but the term developer can be used differently as described below. Dry toner can be a dry mixture of particles and materials. As used in the present invention, dry toner is a dry mixture of materials typically in particulate form.

"Dry toner particles" are particles of one or more materials that can be transferred directly or indirectly using an electrophotographic printer (EP) to a receiver material to produce a desired effect, color, texture, pattern, adhesive, or coating (such as in the case of a foiling toner described below) on the receiver material. Dry toner particles can be ground from larger solids or chemically prepared (for example, precipitated from a solution of a pigment and a dispersant using an organic solvent), using processes and starting materials that are known in the art. Dry toner particles, both colorless and colored, generally have a range of diameters of less than or equal to 8 μm, or less than or equal to 15 μm, or even less than or equal to 30 μm.

Thus, dry toner generally includes dry toner particles as well as other particles of various types and properties. For example, dyes or pigment colorants can be present in the dry toners to provide absorption of incident electromagnetic radiation; biocides to suppress bacterial growth; desiccants to absorb moisture or gasses; binders to improve adhesion to a receiver material; and other additives that are known in the art. Dry toner particles themselves can be coated with even finer particles known as surface treatment agents, such as pyrogenic or colloidal silica, titania, alumina, and fine resin particles, which surface treatment agents can be coated with silanes or silicones.

A "developer" can refer to dry toner alone as used in single-component or mono-component development systems, but it can also refer to a mixture of dry toner and magnetic carrier particles in dual-component, two-component, or multi-component development systems. Magnetic carrier particles are generally known in the art and described for example in U.S. Pat. No. 9,182,690 (Alexandrovich et al., Col. 9), the disclosure of which is incorporated herein by reference.

As used herein the term "pigment colorant" refers to a single material or a combination of different materials that provide color, tone, or hue once applied and fused to a receiver material. Examples of useful pigment colorants are well known in the art and are described in more detail below.

The term "color" is meant to include any image having a tone or hue, or combination thereof, including "white" and "black" colored images.

The identifiers "CL," "W," "Y," "M," "C," and "K" refer to dry toners and toner images having corresponding "colorless," "white," "yellow," "magenta," "cyan," and "black" colors or tones.

Crystalline melting temperatures of the dry color toners and dry foiling toner ingredients such as waxes can be determined at standard atmospheric pressure using equipment and conventional methods, for example using Differential Scanning Calorimetry (DSC) and suitable known equipment designed for this purpose. Both crystalline melting temperatures and heats of melting of waxes can be determined by DSC, as the waxes themselves or as components of a complete toner composition. In the examples of the present invention described below, the wax melting temperature is defined as the temperature at the peak of a melting endotherm, or as the temperature at the peak of the main peak of a multiple melting endotherm material. Commonly used resins in dry toners are amorphous, and thus do not exhibit crystalline melting temperatures. It is noted that there are melt flow methods for characterizing polymeric materials that are reported as "$T_m$" or "melting temperature". A commonly used example is capillary rheometry as conducted on a device such as a commercial Shimadzu CFT-500D "Constant Test Force Extrusion Type Capillary Rheometer Flowtester." A known weight of sample is subject to a constant force to induce melt flow in a capillary while the temperature is continuously increased. "Tm" can be defined as the temperature at which a certain weight of material has flowed. This is not a crystalline melting temperature but rather a melt viscosity related parameter. This method can also be calibrated such that the result is melt viscosity versus temperature.

Glass transition temperature ($T_g$) is a known parameter for amorphous polymeric resins, and for dry toner particles (color or colorless, or foiling as described below), and is typically measured also using known Differential Scanning Calorimetry (DSC) equipment and processes. The $T_g$ values of many useful polymeric resins are also reported in the literature.

Number average molecular weight ($M_n$), typically used to characterize organic polymers, can be determined using Gel Permeation Chromatography (GPC) with polystyrene calibration and known procedures and equipment.

The term "color toner" as used herein refers to dry color toner particles or foiling toner particles containing one or more (b) pigment colorants described below to provide a desired color or hue having an optical density of at least 0.2 at the maximum particle coverage so as to distinguish them from "colorless" dry toner particles that have a lower optical density. In general, such dry color toner particles are "non-fluorescing" in that they do not emit light or "fluoresce" upon exposure to light of a different wavelength to a significant degree.

The term "composite" when used in reference to developed color toner images or developed and fixed color toner images, refers to the one to four fundamental color toner images present in a mono- or multi-color color toner image. Black is considered a "color" for purposes of the present invention. Thus, a "composite color image" or "composite color toner image" can refer to one or more of the fundamental CMYK colors, wherein multiple color toner images can be formed in any desired sequence. White dry toner materials can be formulated with white pigments, and thus can be considered a "color" toner. For the case of white toner images, the optical density is low when measured in reflection on a final receiver, and will not conform to the above description of color toner images having an optical density of at least 0.2 at the maximum particle coverage. However, white images are opaque, such that the optical density measured in transmission is generally greater than 0.2.

The terms "color toner image" and "color toner images" refer to the one or more areas of a print on a receiver material that are covered with the one or more dry color toner particles.

The terms "foiling toner image" and "foiling toner images" refer to the one or more areas of a print on a receiver material that are covered with dry foiling particles and ultimately printing foil. The one or more foiling toner images are typically different from (or exclusive thereof) the one or more color image areas on either the intermediate receiver material or the "final" receiver material. However if the order of transfer of the foiling toner image is such that it is the final layer applied to the final receiver, the foiling toner image can be on top of areas with color toner images.

Uses

The method of the present invention is useful for providing various printed articles having foiling image areas in at least some areas of a surface of printed articles. The present invention is particularly useful in electrophotographic, electrostatic, or xerographic imaging or printing processes to provide both color toner images and foil images either in exclusive areas different from each other, or in processes wherein foiling toner areas are applied on top of the color image areas and designed to directly face the foil transfer material in the lamination step of transferring foil to the areas covered by the foiling toner.

Materials for Processes

Receiver Materials:

The foil images and color toner images can be formed on suitable receiver materials (substrates) that typically have first and second opposing sides or surfaces. The foil images and color toner images can be provided on one or both of these sides or surfaces. As described in more detail below, such foil images and color toner images are generally provided using digital printing processes such as electrostatic printing processes or electrophotographic printing processes that are generally known in the art and generally described by L. B. Schein in *Electrophotography and Development Physics,* $2^{nd}$ Edition, Laplacian Press, Morgan Hills, California, 1996 (ISBN 1-885540-02-7). In some embodiments, toner images formed on a photo receptor member can be directly transferred to the "final" receiver material and then fixed. In a more common embodiment toner images formed on a photoreceptor are then transferred to an intermediate member, and subsequently transferred to the final receiver.

Useful receiver materials include but are not limited to, coated or uncoated paper substrates (cellulosic or polymeric papers) in various geometric forms, polymeric films (such as transparent polymeric films), ceramics, paperboard, cardboard, metals, fibrous webs or ribbons, and other substrate materials that would be readily apparent to one skilled in the art. In particular, the receiver materials can be sheets of paper or polymeric films that can be fed from a supply of receiver materials. More particularly useful receiver materials include paper substrates that have a surface that is "coated" or in which the surface pores are generally filled with appropriate filler materials such as clays or other coating materials known in the paper forming art.

In some embodiments, foil toner latent images and color toner latent images can be formed on photoconductive material or photoreceptor as described above that can be in the form of charged photoconductor belts, webs, or rollers using a suitable light source such as a laser or light emitting diode. Useful materials such as the photoconductor webs, belts, or rollers can be composed of various photoconductive materials known in the art.

Dry Color Toners:

Forming color toner latent images according to the present invention is accomplished using dry color toners that comprise dry color toner particles comprising three essential components: a (a) polymeric resin (sometimes called a binder), or a mixture thereof, a (b) pigment colorant (or mixture thereof), and a (c) wax (or mixture thereof) that has a melting temperature that is defined as $T_{color}$ that is generally at least 90° C. or at least 100° C. and up to and including 135° C. or up to and including 150° C.

Optional components may be incorporated into the dry color toner particles including charge control agents, or onto the outside surfaces thereof, but only the (a), (b), and (c) components identified herein are essential for achieving the advantages of the present invention.

The dry color toner particles can be porous or nonporous. For example, if they are porous particles, up to 60% of the volume can be occupied or unoccupied pores within the (a) polymeric resin that serves as a continuous binder phase or matrix. (b) Pigment colorants, (c) waxes, or other components can be present within the pores, within the (a) polymeric resin, or outside of both and mixed therewith. Pores in the dry toner particles can be created intentionally or unintentionally during manufacture of the dry color toners. The pores in these dry toner particles can be discrete (individual) generally spherical voids, or interconnected voids with irregular shapes, and can be totally within the particles or connect with the outer particle surface.

The dry color toner particles are not generally perfectly spherical so it is best to define them by the median volume diameter ($D_{vol}$) that can be determined as described above. Before fixing, the dry color toner particles can have a $D_{vol}$ of at least 4 μm or of at least 5 μm and up to and including 12 μm or up to and including 20 μm, but larger or smaller particles may be useful.

The dry color toner particles have an external particle surface and consist essentially of the (a) polymeric resin as the polymeric binder phase or matrix, and the (b) pigment colorant and the (c) wax are generally dispersed within the (a) polymeric resin.

The dry color toners generally are not intentionally rendered magnetic by incorporation of magnetic materials when they are formulated to make high color gamut images. However, dry color toners can have magnetic additives when it is desired to make "magnetic ink character recognition" or MICR images that can be used for printing magnetically readable checks of for security purposes Useful (a) polymeric resins of which the dry color toner particles can be composed include any organic polymer or mixture of organic polymers that are suitable for the imaging methods described herein, and particularly the thermal fixing (fusing) operations where they will melt and flow. Each of such organic polymeric resins is generally amorphous and has a glass transition temperature ($T_g$) of at least 50° C. and up to and including 100° C. Many useful (a) polymeric resins are known in the art to be useful for this purpose and include but are not limited to, polycarbonates, resin-modified alkyd polymers, polyamides, polyurethanes, phenol-formaldehyde polymers and various derivatives thereof, polyesters and polyester condensates, aromatic copolymers having alternative methylene and aromatic recurring units (such as styrenic recurring units), and fusible crosslinked polymers. Polyesters, copolymers derived at least in part from a styrenic monomer and an acrylic monomer (thus, styrenic-acrylic copolymers), and acrylic polymers derived from one or more acrylic or acrylic ester monomers, can be particularly useful (a) polymeric resins.

For example, useful (a) polymeric resins can be vinyl polymers such as styrenic homopolymers (derived from styrene or a styrene derivative) and copolymers derived from two or more ethylenically unsaturated polymerizable monomers, such as copolymers derived from one or more of styrene or a styrene derivative, vinyl naphthalene, p-chlorostyrene and two or more acrylic monomers, or two or more unsaturated mono-olefins such as ethylene, propylene, butylene, and isobutylene; vinyl halides such as vinyl chloride, vinyl bromide, and vinyl fluoride; vinyl acetate, vinyl propionate, vinyl benzoate, vinyl butyrate; vinyl esters such as esters of mono carboxylic acids such as acrylates and methacrylate; nitriles such as acrylonitrile and methacrylonitrile; acrylamide and methacrylamides; vinyl ethers such as vinyl methyl ether, vinyl isobutyl ether, and vinyl ethyl ether; N-vinyl indole, N-vinyl pyrrolidone, and other monomers that would be readily apparent to one skilled in the electrophotographic polymer art. Styrenic copolymers derived at least one part from one or more of styrene and a styrene derivative (as styrenic monomer) are particularly useful.

For example, some useful (a) polymeric resins can be prepared as copolymers derived from one or more ethylenically unsaturated polymerizable monomers such as styrene or a styrene derivative and one or more lower alkyl ($C_{1-6}$) acrylates or lower alkyl methacrylates. Some crosslinked polymeric resins are also useful such as those derived at least in part from divinyl benzene, diacrylates, or dimethacrylates. More details of useful (a) polymeric resins that are either vinyl polymers or condensation polymers are provided in U.S. Pat. No. 9,261,808 (Tyagi et al., Col. 7, line 38 to Col. 9, line 13), the disclosure of which is incorporated herein by reference.

In many embodiments of the present invention, the glass transition temperature ($T_g$) of the (a) polymeric resin (or mixture of polymeric resins) in each dry color toner particle is at least 55° C. or at least 60° C., and up to and including 70° C. or up to and including 80° C.

In general, the (a) polymeric resin (or mixture thereof) are present in the dry color toner in an amount of at least 50 weight % or at least 60 weight %, and up to and including 95 weight %, all based on the total dry color toner weight.

Useful (a) polymeric resins can be obtained from various commercial sources or prepared using known starting materials and synthetic procedures known to a skilled polymer chemist.

Each useful dry color toner also contains one or more (b) pigment colorants that can be organic or inorganic in nature, to provide a suitable hue, color, or tone in the resulting fused color toner images. Such pigment colorants can be incorporated into the (a) polymeric resins in known ways, such as by including them in the dry blends described below. Useful (b) pigment colorants include but are not limited to, titanium dioxide, carbon black, Aniline Blue, Calcoil Blue, Chrome Yellow, Ultramarine Blue, DuPont Oil Red, Quinoline Yellow, Methylene Blue Chloride, Malachite Green Oxalate, Lamp Black, Rose Bengal, Colour Index Pigment Yellow 97, and others that are listed in Col. 10 and in the references cited therein of U.S. Pat. No. 9,261,808 (noted above) as well as those described in the Colour Index, Vols. I and II, $2^{nd}$ Edition (1987) or in the Pantone® Color Formula Guide, $1^{st}$ Edition (2000-2001). A preferred pigment colorant set incorporated into cyan, magenta, and yellow color toner particles are Pigment Blue 15:3, Pigment Red 122, and Pigment Yellow 185, respectively.

It is also possible for a (b) pigment colorant to have the function of providing charge control, and thus a charge control agent (described below) can also provide coloration.

The (b) pigment colorants can be present in the dry color toner in an amount of at least 1 weight % or of at least 3 weight % and up to and including 25 weight % or up to and including 40 weight %, all based on the total dry color toner weight. A skilled worker would know how to adjust the amount of individual or mixtures of (b) pigment colorants to achieve the desired hue or color.

It is particularly useful in the practice of this invention wherein the one or more dry color toners comprise at least dry cyan, yellow, magenta, and black toners that correspond to the cyan, yellow, magenta, and black toner latent images and resulting fused cyan, yellow, magenta, and black toner images Useful (b) pigment colorants can be obtained from various commercial sources.

Another essential component of the dry color toner particles is a (c) a wax having a melting temperature defined as $T_{color}$ as described above. Useful (c) waxes can be obtained from various commercial sources or prepared using known starting materials and synthetic procedures.

For example, useful (c) waxes of this type (sometimes known as lubricants) include but are not limited to, low molecular weight polyolefins (polyalkenes) such as polyethylene, polypropylene, and polybutene, such as Polywax 500 and Polywax™ 1000 waxes from NuCera Solutions, Clariant PE130 and Licowax PET90 waxes from Clariant Chemicals, and Viscol 550 and Viscol 660 waxes from Sanyo. Other useful waxes can be obtained from Nippon Oil and Fat under the WE series; silicone resins that can be softened by heating; fatty acid amides such as oleoamide, erucamide, ricinoleamide, and stearamide; vegetable waxes such as carnauba wax, rice wax, candelilla wax, Japan wax, and jojoba wax; animal waxes such as bees wax; mineral and petroleum waxes such as montan wax, ozocerite, ceresine, paraffin wax, microcrystalline wax, and Fischer-Tropsch wax, and modified products thereof. Particularly useful (c) waxes include ester-based waxes and polyethylene waxes, both of which are available from various commercial sources. The melting points of such waxes are either already reported or can be determined as described above in the same manner for measuring polymer melting temperatures. It is critical that the (c) wax have a melting point ($T_m$) greater than or equal to $T_{foiling}$, and this can be determined by routine experimentation by a skilled worker in the electrophotography art.

The useful (c) wax generally can have a number average molecular weight ($M_n$) of at least 400 and up to and including 7,000, which value can be determined using known equipment and procedures in the industry.

The (c) wax (or mixture thereof) is generally present in the dry color toners in an amount of at least 0.1 weight % or of at least 1 weight % and up to and including 10 weight % or up to and including 20 weight %, all based on the total weight of the dry color toner. The optimal amount of (c) wax can be determined during routine experimentation by one skilled in the electrophotography art.

The dry color toners useful in the present invention can also contain a number of optional additives that are commonly useful in dry electrophotographic toners including but not limited to, charge control agents, flow additive particles (hydrophobic fumed silica particles), surface treatment agents and spacing treatment agent particles (such as titania, silica, or alumina particles).

It is further possible for the (b) pigment colorant to also exhibit some fluorescing properties or phosphorescing properties. Useful (b) pigment colorants of this type are known in the art and described for example in Col. 9, lines 48-64 of U.S. Pat. No. 9,261,808 (noted above).

Dry color toners useful in the present invention can be prepared using various known processes wherein the (b) pigment colorant(s) are incorporated into the (a) polymeric resin including but not limited to, melt extrusion processes, limited coalescence processes, spray drying, and other chemical techniques. They can be prepared as "chemically prepared toners," "polymerized toners," or "in-situ toners." They can be prepared using controlled growing instead of grinding. Various chemical processes include suspension polymerization, emulsion aggregation, micro-encapsulation, dispersion, and chemical milling. Details of such processes are described for example in the literature cited in [0010] of U.S. Patent Application Publication 2010/0164218 (Schulze-Hagenest et al.), the disclosure of which is incorporated herein by reference. Limited coalescence processes are described for example in U.S. Pat. No. 5,298,356 (Tyagi et al.) and U.S. Patent Application Publication 2011/0262858 (Nair et al.) especially if porous toner particles are desired, both of which disclosures are incorporated by reference in their entirety. Spray/freeze drying techniques are described for example in U.S. Patent Application Publication 2011/0262654 (Yates et al.), the disclosure of which is incorporated herein by reference.

In a particularly useful manufacturing method, a desired (a) polymeric resin (or mixture thereof) is produced independently using a suitable polymerization process known in the art. The one or more (a) polymeric resins are dry blended or mixed as suitably sized polymeric resin particles with suitable (b) pigment colorant(s) and (c) wax(es) as described above) to form a uniform dry blend. Optional additives described above can also be incorporated into this dry blend with the three essential (a) polymeric resin, (b) pigment colorant, and (c) wax components. The amounts of the essential and optional components can be adjusted in the dry blend in a suitable manner that a skilled worker would readily understand to provide the desired amounts in the resulting dry color toner particles. The conditions for mechanical dry blending are known in the art.

The dry blend so formed is then melt processed in a suitable apparatus such as a two-roll or hot-melt extruder, for example under low or high shear conditions to form an extruded composition. The melt processing time can be at least 0.2 minute and up to and including 60 minutes and the time can be adjusted by a skilled worker to provide the desired melt processing temperature and uniformity in the resulting extruded composition.

Generally, the dry blend can be melt-extruded in an extrusion device at a temperature higher than the $T_g$ of the (a) polymeric resin(s) and generally at a temperature of at least 90° C. and up to and including 240° C. The resulting extruded composition is sometimes known as a "melt product" or a "melt slab" and is generally cooled, for example to room temperature, and then broken up (for example, pulverized) to form dry color toner particles having the desired $D_{vol}$ as described above. It is generally best to first coarse grind the extruded composition prior to a specific pulverizing operation. Grinding can be carried out using any suitable procedure, for example crushing and grinding using a fluid energy or jet mill as described for example in U.S. Pat. No. 4,089,472 (Seigel et al.), the disclosure of which is incorporated herein by reference. The particles can then be further reduced in size using high shear pulverizing devices such as a fluid energy mill, and then classified as such.

The resulting dry color toner particles can then be surface treated with suitable surface treatment agents including but not limited to, hydrophobic flow additive particles (composed for example of a metal oxide with a silane coating). Other purposes of surface treatment agents include charge control and electrostatic transfer improvement. Useful surface treatment agents are generally dispersed on the dry toner materials in a suitable mixer, many types of which are known in the art.

The resulting dry color toner particles can be classified (sieved) through a 230 mesh vibratory sieve to remove non-attached metal oxide particles, agglomerates, and any other components that may not have been incorporated into the dry color toner particles.

Dry Foiling Toners:

The dry foiling toners used in the practice of this invention comprise dry foiling toner particles having only two essential components: (a') polymeric resin, and (c') wax having a melting temperature defined as $T_{foiling}$. It is critical as noted above that $T_{foiling}$ is less than $T_{color}$ by at least 15° C. or by at least 30° C., or by at least 70° C. In addition, $T_{foiling}$ is generally at least 55° C. and up to and including 70° C. or up to and including 90° C.

The dry foiling toners useful in this invention are similar to the dry color toners used in the practice of this invention except they have the differences as described above in wax melting temperature and in some of the properties described below.

Optional components may be incorporated into the dry foiling toner particles or outside thereof as noted below, but only the (a') and (c') components identified herein are essential for achieving the advantages of the present invention.

The dry foiling toners comprise dry foiling toner particles that can be porous or nonporous. For example, if they are porous particles, up to 60% of the volume can be occupied or unoccupied pores within the (a') polymeric resin that serves as a continuous binder phase or matrix. (c') Waxes or other components can be present within the pores, within the (a') polymeric resin, or outside of both and mixed therewith.

The dry foiling toner particles are not generally perfectly spherical so it is best to define them by the median volume diameter ($D_{vol}$) that can be determined as described above. Before fixing, the dry foiling toner particles can have a $D_{vol}$ of at least 4 μm or of at least 5 μm and up to and including 12 μm or up to and including 20 μm, but larger or smaller particles may be useful.

The dry foiling toner particles can be designed to have unique a $D_{vol}$ that is more suitable for a particular use or receiver material. For example if they are to be applied to smooth receiver materials, the $D_{vol}$ could be in the range of at least 5 μm and up to and including 15 μm. However, when the dry foiling toner particles are to be applied to "rougher" receiver materials, they could have a larger $D_{vol}$.

The dry foiling toner particles have an external particle surface and consist essentially of the (a') polymeric resin as the polymeric binder phase or matrix, and the (c') wax is generally dispersed within the (a') polymeric resin.

The dry foiling toners are not intentionally rendered magnetic by incorporation of magnetic materials.

Useful (a') polymeric resins of which the toner particles can be composed of any organic polymer or mixture of organic polymers that are suitable for the imaging methods described herein, and particularly the thermal fixing (fusing) operations where they will melt and flow. Each of such organic polymeric resins is generally amorphous and has a glass transition temperature ($T_g$) of at least 45° C. and up to and including 60° C. or up to and including 70° C. Many useful (a') polymeric resins are known in the art to be useful for this purpose and can be the same as or different from those materials used to prepare the (a) polymeric resins and dry color toner particles as described above. Polyesters, styrenic copolymers derived at least in part from styrene or a styrene derivative (a styrenic copolymer) and one or more acrylic or acrylic ester monomers, and acrylic polymers can be particularly useful (a') polymeric resins.

In addition, it can be important for the (a') polymeric resins (or mixture thereof) to have a $T_g$ that is less than the $T_g$ of each (a) polymeric resin (or mixture thereof) forming the dry color toner particles described above. This difference in $T_g$ can be at least 5° C. or even at least 10° C.

In general, the (a') polymeric resin (or mixture thereof) are present in the dry foiling toner in an amount of at least 60 weight % and up to and including 95 weight %, all based on the total dry foiling toner weight.

Useful (a') polymeric resins can be obtained from various commercial sources or prepared using known starting materials and synthetic procedures known to a skilled polymer chemist.

A second essential component of the dry foiling toner particles is a (c') a wax having a melting temperature defined as $T_{foiling}$ that is less than $T_{color}$ of the (c) wax by at least 15° C., or at by at least 30° C., as described above. Useful (c') waxes can be obtained from various commercial sources or prepared using known starting materials and synthetic procedures. The wax (c') is chosen to serve as a "fuser release agent", and as an "abrasion resistance agent" for the resulting fused foiling images as prepared on the receiver material, and the wax can perform these functions while also attracting the foil during the thermal lamination step where the foil is attracted to the fused foiling toner image as assisted by the wax in the foiling toner image with a crystalline melting temperature of $T_{foiling}$.

For example, useful (c') waxes of this type (sometimes known as lubricants) include but are not limited to, low molecular weight polyolefins (polyalkenes) such as polyethylene, polypropylene, and polybutene, such as Polywax 500 and Polywax™ 1000 waxes from NuCera Solutions, Clariant PE130 and Licowax PE190 waxes from Clariant Chemicals, and Viscol 550 and Viscol 660 waxes from Sanyo. Other useful waxes can be obtained from Nippon Oil and Fat under the WE series; silicone resins that can be softened by heating; fatty acid amides such as oleoamide, erucamide, ricinoleamide, and stearamide; vegetable waxes such as carnauba wax, rice wax, candelilla wax, Japan wax, and jojoba wax; animal waxes such as bees wax; mineral and petroleum waxes such as montan wax, ozocerite, ceresine, paraffin wax, microcrystalline wax, and Fischer-Tropsch wax, and modified products thereof. The melting points of such waxes are either already reported or can be determined as described above. Since it is critical that the (c') wax have a melting point less than the melting point of the (c) wax in the dry color toners, a skilled worker could use routine experimentation to determine which wax should be used as the (c) wax and which other wax should be used as the (c') wax according to the present invention.

The (c') wax (or mixture thereof) is generally present in the dry foiling toners in an amount of at least 0.1 weight % or of at least 1 weight % and up to and including 10 weight % or up to and including 20 weight %, all based on the total weight of the dry foiling toner. The optimal amount of (c') wax can be determined during routine experimentation by one skilled in the electrophotography art.

The dry foiling toners useful in the present invention can also contain a number of optional additives that are commonly useful in electrophotographic toner materials including but not limited to, charge control agents, flow additive particles (hydrophobic fumed silica particles), surface treatment agents, and spacing treatment agent particles (such as titania, silica, or alumina particles). These optional additives can be the same as or different from the optional additives used in the dry color toners described above.

While it is usually desired that the dry foiling toner particles are "colorless" as defined above, it is possible that such particles can also include one or more (b') pigment colorants that can be organic or inorganic in nature, to provide a suitable hue, color, or tone in the resulting fused foiling toner images. Such pigment colorants can be incorporated into the (a') polymeric resins in known ways, such as by including them in the dry blends described below. The (b') pigment colorants can be the same as or different from the (b) pigment colorants described above.

It is also possible for a (b') pigment colorant to have the function of providing charge control, and thus a charge control agent (described below) can also provide coloration.

If present, the amount of (b') pigment colorants in the dry foiling toners can be at least 0.5 weight % or at least 3 weight % and up to and including 15 weight % or up to and including 25 weight %, all based on the total dry foiling toner weight. A skilled worker would know how to adjust the amount of individual or mixtures of (b') pigment colorants to achieve the desired hue or color under the resulting foiling toner images.

Dry foiling toners useful in the present invention can be prepared using various known processes such as those described above for preparing the dry color toners.

In a particularly useful manufacturing method, a desired (a') polymeric resin (or mixture thereof) can be produced independently using a suitable polymerization process known in the art. The one or more (a') polymeric resins can be dry blended or mixed as polymeric resin particles with suitable (c') wax(es) as described above) to form a uniform dry blend. Optional additives described above, including the (b') pigment colorants, can also be incorporated into this dry blend with the two essential (a') polymeric resin and (c') wax components. The amounts of the essential and optional components can be adjusted in the dry blend in a suitable manner such that a skilled worker would readily understand to provide the desired amounts in the resulting dry foiling toner particles. The conditions for mechanical dry blending are known in the art.

The dry blend so formed in then melt processed (such as melt extruded) in a suitable apparatus, cooled, for example to room temperature, and then broken up (for example pulverized) into dry foiling toner particles having the desired $D_{vol}$ as described above, similar to the preparation of the dry color toner particles.

The resulting dry foiling toner particles can then be surface treated with suitable agents including hydrophobic flow additive particles (composed for example of a metal oxide with a silane coating). Other purposes of surface treatment additives include charge control and electrostatic transfer improvement. The surface treatment agents are dispersed on the dry toner materials in a suitable mixer many types of which are known in the art.

The resulting dry foiling toner particles can be classified (sieved) through a 230 mesh vibratory sieve to remove non-attached metal oxide particles, agglomerates, and any other components that may not have been incorporated into the dry color toner particles.

It is noted that the dry color toner and dry foiling toner formulations are designed such that a receiver material having thereon both color toner latent images and foiling toner latent images can pass through the fusing subsystem of the electrographic printer simultaneously without creating problems. This requires that the (c) and (c') waxes or mixtures of such waxes function as fuser release aids and that the melt flow properties of each of the respective toner formulations will result in fused color toner images and fused foiling toner images, respectively, having good adhesion to the receiver material without contamination of the fusing surface by either toner formulation due to undesirable effects such as hot offset whereby a toner image splits in the fusing nip and some toner particles stay on the fusing surface. The present invention provides formulations that function well in this regard while offering adequate foil transfer temperature latitude in the laminator where the fused foiling toner image must be significantly more adhesive than the fused color toner image to achieve the selective transfer of the printing foil. In general, the fusing temperatures are much higher than the temperatures (FT) achieved in step D) or step E') described below, when forming the one or more foil images.

Developers:

The dry color toners and dry foiling toners used in the present invention can be used as dry mono-component developers, or each of them can be combined with carrier particles to form dry two-component developers. In all of these embodiments, a plurality (usually millions) of individual dry toner particles are used together. Such dry mono-component or dry two-component developers generally comprise one or more of the optional additives described above for the dry color toners and dry foiling toners, for example charge control agents or flow additive particles.

Useful one-component developers generally comprise the dry color toner particles or dry foiling toner particles described herein as the essential component. Dry two-component developers generally comprise carrier particles (also known as carrier vehicles) that are known in the electrophotographic art and can be selected from a variety of materials such as uncoated carrier core particles (such as magnetic particles) and core magnetic particles that are overcoated with a thin layer of a film-forming polymer such as a silicone resin type polymer, poly(vinylidene fluoride), poly(methyl methacrylate), or mixtures thereof.

The carrier particles can be electrically conductive or non-electrically conductive. The carrier particles can be larger than the dry color toner particles or the dry foiling toner particles, and can have a median diameter of at least 15 μm and up to and including 300 μm, which parameter can be measured in a known manner as described above for the $D_{vol}$ of the various toner particles.

The amount of dry color toner particles or dry foiling toner particles in a two-component developer can be at least 4 weight % and up to and including 20 weight %, based on the total dry weight of the two-component dry developer.

A magnetic field can be used to move the developer in electrophotographic systems by exerting a force on the magnetic carrier particles. The developer is moved into proximity with an intermediate receiver material such as a photoreceptor by the magnetic field, and the dry color toner particles or dry foiling toner particles that are in the developer are transferred from the developer to the receiver material by an electric field.

Printing Foil:

A printing foil is used in the practice of this invention to provide one or more foil images on a receiver material. This printing foil is also known in the art as a "transfer foil" or printing foil and refers to a material obtained by, for example, sputtering a thin film of metal such as aluminum onto a base substrate or "carrier film." The printing foil can be used to provide text or picture images having a metallic or glossy appearance. In the present invention, a printing foil can generally be a composite structure having an organic polymeric substrate (or "base substrate") having disposed thereon, in order from the organic polymeric substrate, a release layer, a metallized layer, and an adhesive layer, all of which are described in more detail below. Other embodiments of printing foils also comprise colorant layers in order to change the hue of the metallized layer, and printable layers on top of the metallized layer to assist in printing color images onto foil images in a second printing step ("post-foiling" operation).

In the present invention, transfer of a printing foil to a receiver material comprising one or more fused color toner images and one or more fused foiling toner images is accomplished in a device such as a thermal laminator where the roll-fed printing foil is brought into contact with receiver materials having fused color toner images in a nip formed by a heated transfer roller on the side with the printing foil and a backup pressure roller on the side of the receiver material that will not receive foil. Transfer of the metallized foil layer(s) of the printing foil to only the fused foiling toner images but not the fused color toner images is accomplished at appropriately selected laminating temperature, nip width, nip pressure, and operating speed, all of which operating parameters can be determined using routine experimentation in view of the teaching provided herein and in the working examples below.

For example, in some embodiments, the base substrate of the printing foil can be film-like and composed of one or more transparent or non-transparent polymeric films such as a transparent film composed of polyethylene terephthalate (PET), polyethylene naphthalate (PEN), polypropylene (PP), a polysulfone resins, or a polyimide resin, or laminated composites thereof. Cellulosic materials (such as resin-coated papers) are also useful as the base substrate.

On the base substrate can be disposed a "release" layer that can be composed of a thermo-curable resin such as a polyacrylic resin that is curable using a melamine or isocyanate hardener, or a UV or electron beam curable acrylic resin or epoxy resin, along with a suitable release agent (such as a silicone or fluoro compound) as would be known in the art. This release layer provides suitable peel strength and facilitates smooth and complete release of the metalized layer and adhesive layer when the base substrate is pulled off the foil image areas.

On the release layer is disposed a thin metallized layer having a desired metallic or shiny finish obtained by the presence of suitable metals or metallic colorants, such as aluminum, tin, silver, chromium, nickel, and gold, or suitable alloys of metal such as bronze.

An adhesive layer typically composed of a hot melt adhesive, or thermo-sensitive adhesive, can be generally disposed on the metallized layer to facilitate adhesion to the dry foiling toner. Such adhesive layers can compose an ethylene/vinyl acetate copolymer, vinyl chloride/vinyl acetate copolymer, epoxy resin, ethylene/vinyl alcohol polymer, or other polymeric resin that readily adheres to both the metallized layer as well as the dry foiling toner during transfer of the foiling film to the receiver material.

Some embodiments of printing foils also include a "printable layer" between the release layer and the metallized layer. This printable layer remains with the metallized layer when the base substrate is peeled away and can be printed using any number of imaging processes.

Various printing foils having this or similar layer arrangements useful in the present invention can be obtained from several commercial sources, for example as Nobelus® brand sleeking films including but not limited to, their internet-advertised (www.nobelus.com) holographic metallized sleeking foil, gloss sleeking foil, cracked ice sleeking foil, gold printable sleeking foil, rainbow sleeking foil, red sleeking foil, rose gold sleeking foil, regal blue sleeking foil, silver printable sleeking foil, silver sleeking foil, and sparkle holographic metallized sleeking foil. Jolybar (Israel) also markets aluminum foils that can be used for this purpose. Alternatively, printing foils can be prepared using the procedures and starting materials described for example, in U.S. Pat. No. 8,530,122 (Uchino et al.) and U.S. Pat. No. 8,993,208 (Matsushima et al.), the disclosures of both of which are incorporated herein by reference.

Printing foils can be manufactured and used as having various overall thicknesses as would be known in the art, depending upon the machine being used to form the foil images and what texture may be desired in the final articles.

Imaging Methods

The process or method of the present invention can be carried out using devices including printers, copiers, scanners, and facsimiles, and analog and digital devices, all of which can be referred to as "printers." Various embodiments described herein are useful with electrostatographic devices or electrophotographic devices that employ the various dry color toners and dry foiling toners described herein that are developed on a suitable receiver material. The present invention is not carried out using inkjet printing in any stage or step, or in any manner.

A digital reproduction printing system ("printer") useful in the present invention typically includes a digital front-end processor (DFE), a print engine (also referred to in the art as a "marking engine") for applying dry color toner and dry foiling toner to a receiver material, and one or more post-printing finishing system(s) (for example, a UV coating system, a glosser system, or a laminator system), and particularly a foil application (or Sleeking™) apparatus. In some embodiments, a single device or system can be used for both providing the fused color toner images and fused foiling images as well as applying foil to the fused foiling images, as described in U.S. Pat. No. 10,795,313B2 (Sakai et al.), the disclosure of which is incorporated herein by reference. However, in other embodiments, it may be desirable to use separate machines or apparatus, one to provide the fused color toner images and fused foiling agents, and another machine to apply foil to the fused foiling images. Examples of such separate commercially available machines are described below.

A printer can reproduce pleasing color toner images (including black-and-white, monochrome, or polychrome images) onto a receiver material. This printer can also produce selected patterns of foil images on the same receiver material, which foil images do not correspond directly to a visible image, i.e. the foil images are different from the color toner images.

The DFE receives input electronic files (such as Postscript command files) composed of images from other input devices (for example, a scanner, a digital camera, or a computer-generated image processor). Within the context of the present invention, images can include photographic renditions of nature, people, or animals or other creatures, as well as other types of visual content such as text or graphical elements, and desired foil images. Images can also include invisible content such as specifications of texture, glossiness, or protective coating patterns on the same receiver material.

The DFE can include various function processors, such as a raster image processor (RIP), image positioning processor, image manipulation processor, color processor, or image storage processor. The DFE rasterizes input electronic files into image bitmaps for the print engine to print. In some embodiments, the DFE permits a human operator to set up parameters such as layout, font, color, paper type, or post-finishing options. The print engine takes the rasterized image bitmap from the DFE and renders the bitmap into a form that can control the printing process from the exposure device to transferring the various images onto the receiver material. The finishing system can apply features such as protection, gloss, or binding to the prints. The finishing system, such as for foiling, can be implemented as an integral component of a printer, or provided as a separate machine through which prints with color toner images are fed after they are printed.

The printer can also include a color management system that accounts for characteristics of the image printing process implemented in the print engine (for example, the electrophotographic process) to provide known, consistent color reproduction characteristics. The color management system can also provide known color reproduction for different inputs (for example, digital camera images or film images). Color management systems are well-known in the art, and any such system can be used to provide color corrections in accordance with the present invention.

In one embodiment of an electrophotographic modular printing machine useful with various embodiments of the present invention (for example, using a NEXPRESS SX 3900 printer manufactured by Eastman Kodak Company of Rochester, NY), color toner images are made in a plurality of imaging modules containing suitable dry color toner particles of different colors, all arranged in tandem, and latent color toner images are successively electrostatically transferred to a receiver material adhered to a transport web moving through the modules. Dry color toner particles are described above. Commercial machines of this type typically employ intermediate receiver materials (also known as "intermediate transfer members") in the respective imaging modules for transferring visible latent color toner images from the photoreceptor to the receiver material. In other electrophotographic printers, each latent color toner image is directly transferred to a receiver material to form the corresponding color toner image.

Electrophotographic printers having the capability to also deposit dry colorless or clear toner using an additional imaging module are also known. The provision of a dry clear toner overcoat to a color toner image can be useful desirable for providing features such as protection from fingerprints, reducing certain visual artifacts, or providing desired texture or surface finish characteristics. The dry colorless toners described above are used similarly to the use of dry color toners. However, a dry clear toner overcoat can add cost and reduce color gamut of the color toner image and thus, it is desirable for an operator/user to determine whether or not a dry clear toner overcoat needs to be applied to the entire color toner image(s). A uniform layer of dry clear toner can be provided. Alternatively, a dry clear toner layer that varies inversely according to heights of the color toner images can also be used to establish level toner image stack heights. The respective dry color toners are generally deposited one upon the other at respective locations on the receiver material and the height of a respective color toner image stack is the sum of the toner heights of each respective dry color toner. Uniform stack height provides the color toner image(s) with a more even or uniform gloss.

The use of printing foil (described above) to provide one or more foil images on the receiver material containing one or more color toner images, can be achieved in a manner that is integral with the electrophotographic printer described above. In other words, the foil images can be formed using a component of the electrophotographic printer, such as by putting the dry foiling toner in one of the imaging modules in sequence with the imaging modules containing dry color toner(s), and then providing a foiling device that is integral with the electrophotographic printer that will bring the printing foil into intimate contact with the receiver material containing both the dry color toner(s) and the dry foiling toner, all after these dry toners have been fixed or fused on the receiver material. U.S. Pat. No. 10,795,313B2 (noted above) describes a useful system for this purpose.

In other embodiments, a separate electrophotographic printer can be used to provide the color toner images and the foil images on a receiver material (for example using the Eastman Kodak NexPressSX 3900 printer described above). Foiling can then be provided on the receiver material containing color toner images and fused foiling toner using a commercial "laminator" such as the KOMFI® AMIGA 36 Custom Laminating System (available from Nobelus® Company), that is a separate machine from the electrophotographic printer.

More specifically, a method for providing a foil image on a receiver material (also known as a "substrate" or "final" receiver material) is carried out using the following described steps or operations A), B), C), and D) in the same or different imaging machines. In all instances, the present invention is carried out using only dry toners and printing foil as imaging means. No other imaging means, such as inkjet printing or use of liquid toners, is contemplated in carrying out the present invention, and these means of imaging are expressly excluded from the scope of the present invention. In most embodiments, A) through D) are carried out in the noted order. However, A) and B) can be carried out simultaneously or reversed in some embodiments.

In A), using a suitable printer as described herein, one or more color toner latent images are provided in what are termed "color image areas" on a surface of a suitable receiver material (described above). The color image areas are distinguishable or different from all foiling image areas described below so that resulting foil images are generally outside all of the color toner images, but they can be adjacent in area, or have gaps in which there is no image of any type on the receiver material surface. Optionally, however, the foiling image areas may be designed to overlap one or more of the color image areas when the machine configuration places the dry foiling toner on top of some of the color toner latent images such that the metallized foil of the printing foil will contact only the fused foiling toner image(s). In most embodiments, the printing foil does not contact the fused color toner image(s) in the areas of overlap. As used herein, a color toner latent image can also be considered a "charge-only image" prior to the application of toner particles, for example, as formed on an intermediate receiver material such as a photoconductive belt or roller.

The one or more color toner latent images are provided either on the receiver material, or on an intermediate receiver material (such as a photoconductive belt or roller) using corresponding one or more dry color toners, each of which dry color toners is described in more detail above as being composed of dry toner particles comprising at least a (a) polymeric resin, a (b) pigment colorant, and a (c) wax having a melting temperature greater than or equal to $T_{color}$.

In general, B) is carried out simultaneously with or subsequently to this step A). However, there may be embodiments, where A) can follow B) in carefully designed printing operations. In B), one or more foiling toner latent images are provided in one or more foiling image areas on the receiver material surface that was "printed" in A), using a dry foiling toner that is described in more detail above as comprising dry foiling toner particles comprising at least a (a') polymeric resin and a (c) wax having a melting temperature $T_{foiling}$. In general, all of the one or more foiling toner latent images are different from the one or more color toner latent images described above. However if any of the foiling toner images are superposed on any of the color toner latent images they will be contacted with the foil and will "receive" or be adhered to the foil in the lamination step. If the foiling toner image is applied first and then a section is covered by a color image area that area of the foiling image will not result in transfer of the foil. Moreover, as noted above, the $T_{foiling}$ must be less than $T_{color}$ by at least 15° C. or by at least 20° C., or by at least 30° C.

Once the one or more color toner latent images and the one or more foiling toner latent images are formed, all latent images are fixed (or fused) simultaneously in the same fixing operation generally with the same fusing apparatus or station on the surface of the receiver material. This fixing operation C) is carried out using an essentially fuser oil-free environment, to provide one or more corresponding fused foiling toner images and one or more corresponding fused color toner images, all on the same receiver material. By "fuser oil-free," it is meant that fuser oils are entirely absent from the fixing operation, or if present, they are used in a relatively low amount compared to conventional fuser oil fixing operations. For example, the fuser oil is not used at all or it is used in such fixing operations in an amount of less than 1.5 mg of fuser oil per A-4 sheet of paper having a surface area of about 621.6 $cm^2$, or even less than 1 mg of fuser oil per A-4 sheet, of receiver material area. In other aspects, the fixing operation is carried out using conventional means, times, and temperatures, and typically using heated rollers and suitable pressure as are known in the electrophotographic art.

In D), receiver materials containing the one or more color image areas and one or more foiling image areas prepared in A) and B) and simultaneously fused (or fixed) in C), are brought into intimate contact with a printing foil (as described above) at an appropriate foiling temperature (FT) that is greater than $T_{foiling}$ but less than $T_{color}$. For example, FT can be at least 65° C. or at least 70° C., and up to and including 145° C., and FT will vary with the particular foil transfer device or laminator that is used, and thus a skilled worker would know how to find an optimal FT for D) using the teaching in the art relating to foil laminating and the various instructions associated with individual commercial laminating devices.

Some embodiments of the present invention relate to electrophotographic imaging methods for providing an article or a multiplicity of articles, each of which has one or more foil images on a surface thereof, using color toner latent images and foiling toner latent images. This method includes steps or operations A'), B'), C'), D'), and E') as described below. In most of these embodiments, these five operations are carried out in the noted order. However, it is possible for A') and B') to be carried out simultaneously, or for B') to precede A').

In A'), one or more color toner latent images are developed in one or more color image areas, to form a composite color toner image on an intermediate receiver material (as described above). Each corresponding dry color toner comprises dry toner particles comprising: a (a) polymeric resin, a (b) pigment colorant, and a (c) wax that has a melting temperature that is defined as $T_{color}$, all as described above. As used herein, the "color toner latent images" can also be known in the art as "charge-only images" before color toner(s) is actually applied to the intermediate receiver material.

In most embodiments, simultaneously with or subsequently to A'), one or more foiling toner latent images are developed in one or more foiling image areas to provide one or more foiling toner images on the intermediate receiver material, in B'), using a dry foiling toner comprising dry foiling toner particles as described above, wherein the one or more foiling image areas are different from the one or more color image areas, and $T_{foiling}$ is less than $T_{color}$ by at least 15° C. or by at least 30° C.

Following B'), the composite color toner image and the one or more foiling toner images can be transferred from the intermediate receiver material to a receiver material in C') using conventional means that are provided in various electrophotographic apparatus as would be understood by one skilled in the art.

In a single fixing operation of D'), the transferred composite color toner image and the transferred one or more foiling toner images are fixed simultaneously in a fuser oil-free fusing operation, as described above, to provide a corresponding fixed composite color toner image and one or more corresponding fixed foiling toner images.

Lastly, in E'), one or more foil images are formed in the one or more foiling toner images and not in the one or more color image areas by bringing a printing foil into intimate contact with the one or more corresponding fixed foiling toner images at a foiling temperature (FT) using the conditions and equipment described above to provide an article with one or more foil images and a composite color toner image.

In some embodiments, this electrophotographic imaging method can be carried out in A') and B') with the application of dry black toner, dry yellow toner, dry cyan toner, dry magenta toner, and dry foiling toner to an intermediate receiver material in the listed order from corresponding individual modules of an electrophotographic printing machine. In other embodiments, the dry foiling toner and the various dry color toners can be applied to an intermediate received material in any suitable different sequences.

Some useful electrophotographic apparatus that can be adapted for use in the present invention are described for example in U.S. Pat. No. 9,182,690 (noted above) and particularly the teaching shown in FIGS. 1-3 and from Col. 10 (line 56) to Col. 16 (line 55), which teaching is incorporated herein by reference. Such apparatus can be adapted to provide foiling images within the machine itself or in combination with a suitable laminating device as described above.

The present invention provides at least the following embodiments and combinations thereof, but other combinations of features are considered to be within the present invention as a skilled artisan would appreciate from the teaching of this disclosure:

1. A method for providing a foil image on a receiver material without inkjet printing, the method comprising the following A) through D):

A) providing one or more color toner latent images in one or more color image areas on a surface of a receiver material, using corresponding one or more dry color toners, each corresponding dry color toner comprising dry toner particles comprising: a (a) polymeric resin, a (b) pigment colorant, and a (c) wax that has a melting temperature defined as $T_{color}$;

B) simultaneously with or subsequently to A), providing one or more foiling toner latent images in one or more foiling image areas on the surface of the receiving material, using a dry foiling toner comprising dry foiling toner particles comprising: a (a') polymeric resin and a (c') wax that has a melting temperature defined as $T_{foiling}$, wherein the one or more foiling image areas are different from the one or more color image areas, and $T_{foiling}$ is less than $T_{color}$ by at least 15° C.;

C) simultaneously fixing the one or more color toner latent images and the one or more foiling toner latent images on the surface of the receiving material, in a fuser oil-free fusing operation, to provide one or more corresponding fused color toner images and one or more corresponding fused foiling toner images; and D) forming one or more foil images in the one or more foiling image areas and not in the one or more color image areas, by bringing a printing foil into intimate contact with the one or more corresponding fused foiling toner images at a foiling temperature (FT) that is greater than $T_{foiling}$ but less than $T_{color}$.

2. An electrophotographic imaging method for providing an article having one or more foil images using toner latent images, the method comprising the following A') through E'):

A') developing one or more color toner latent images in one or more color image areas using corresponding dry color toners, to form a composite color toner image on an intermediate receiver material, each corresponding dry color toner comprising dry toner particles comprising: a (a) polymeric resin, a (b) pigment colorant, and a (c) wax that has a melting temperature defined as $T_{color}$;

B') simultaneously with or subsequently to A), developing one or more foiling toner latent images in one or more foiling image areas to provide one or more foiling toner images on the intermediate receiver material, using a dry foiling toner comprising dry foiling toner particles comprising: a (a') polymeric resin and a (c') wax that has a melting temperature defined as $T_{foiling}$, wherein the one or more foiling image areas are different from the one or more color image areas, and $T_{foiling}$ is less than $T_{color}$ by at least 15° C.;

C') transferring the composite color toner image and the one or more foiling toner images from the intermediate receiver material to a final receiver material;

D') simultaneously fixing the transferred composite color toner image and the transferred one or more foiling toner images in a fuser oil-free fusing operation, to provide a corresponding fixed composite color toner image and one or more corresponding fixed foiling toner images; and E') forming one or more foil images in the one or more foiling toner images and not in the one or more color image areas, by bringing a printing foil into intimate contact with the one or more corresponding fixed foiling toner images at a foiling temperature (FT) that is greater than $T_{foiling}$ but less than $T_{color}$, to provide an article with one or more foil images and a composite color toner image.

3. The electrophotographic imaging method of embodiment 2, wherein A') and B') are carried out with the application of dry black toner, dry yellow toner, dry cyan toner, dry magenta toner, and dry foiling toner to the intermediate receiver material in the listed order from corresponding individual modules of an electrophotographic printing machine.

4. The method of any of embodiments 1 to 3, wherein $T_{color}$ is at least 90° C. and up to and including 150° C.

5. The method of any of embodiments 1 to 4, wherein $T_{foiling}$ is at least 55° C. and up to and including 90° C.

6. The method of any of embodiments 1 to 5, wherein FT is at least 65° C. and up to and including 145° C.

7. The method of any of embodiments 1 to 6, wherein each (a) polymeric resin of each dry color toner has a glass transition temperature ($T_g$) of at least 55° C. and up to and including 80° C.

8. The method of any of embodiments 1 to 7, wherein the (a') polymeric resin of the dry foiling toner has a glass transition temperature ($T_g$) of at least 45° C. and up to and including 70° C.

9. The method of any of embodiments 1 to 8, wherein the (a') polymeric resin has a $T_g$ that is less than the $T_g$ of each (a) polymeric resin by at least 5° C.

10. The method of any of embodiments 1, 2 and 4-9, wherein the one or more corresponding dry color toners comprise at least dry cyan, yellow, magenta, and black toners.

11. The method of any of embodiments 1 to 10, wherein the receiver material is a paper substrate or a polymeric film.

12. The method of any of embodiments 1 to 11, wherein the (a) polymeric resin comprises one or more resins selected from the group consisting of polyesters, styrenic-acrylic copolymers, and acrylic polymers.

13. The method of any of embodiments 1 to 12, wherein the (c) wax is selected from the group consisting of an ester-based wax or a polyethylene wax.

14. The method of any of embodiments 1 to 13, wherein the dry foiling toner is colorless.

15. The method of any of embodiments 1 to 14, wherein the (a') polymeric resin comprises one or more resins selected from the group consisting of polyesters and styrenic copolymers.

16. The method of any of embodiments 1 to 15, wherein $T_{foiling}$ is less than $T_{color}$ by at least 30° C.

17. The method of any of embodiments 1 to 16, wherein the printing foil comprises a composite of an organic polymer substrate having disposed thereon, in order from the organic polymer substrate, a release layer, a metallized layer, and an adhesive layer.

The following Examples are provided to illustrate the practice of this invention and are not meant to be limiting in any manner. Unless otherwise noted, the weight % values for components of the various dry color toners and the dry foiling toners are based on the total dry weight of the toner formulation.

Example 1

This example provides an evaluation of the efficiency of foil transfer as a function of lamination temperature from a silver-colored printing foil to various black-colored foiling toner images on the surface of a representative receiver material. These procedures simulate how best the present invention can be carried out. It was seen that a dry foiling toner comprising a suitable lower $T_m$ wax can facilitate 100% foil transfer at a selected lamination temperature at which a dry toner comprising a suitable higher $T_m$ wax will exhibit 0% foil transfer.

In potential commercial use of the present invention, the dry color toners with the suitable higher $T_m$ can be formulated to have (a) polymeric resin, and various colors such as for example, cyan, magenta, yellow and black, by incorporating various (b) pigment colorants and would be designated as dry color toners having a (c) wax having a $T_m$ defined as $T_{color}$, while dry toner particles having a (a') polymeric resin and a suitable lower $T_m$ (c') wax now designated as with $T_m$ of this wax now defined as $T_{foiling}$. The dry foiling toner can be formulated with or without a colorant as aesthetically desired. In the final foil image, the metallized layer itself is opaque and will mask any colorant incorporated into the dry foiling toner.

Laboratory scale dry black polyester-containing toner particles were prepared comprising 8 weight % of each of a series of (c') waxes of varying melting temperatures. The mixture of (a') polymeric resin for all samples of dry black-colored foiling toner particles comprised an equal weight blend of higher melt viscosity and lower melt viscosity amorphous polyester materials obtained from the Kao Corporation. Because the two polyesters are amorphous, they do not physically have a melting transition as do the waxes described below. The higher viscosity (a') polymeric resin had a $T_{1/2}$ temperature measured by the Shimadzu capillary rheometer method of 145° C., while that of the lower viscosity (a') polymeric resin had a $T_{1/2}$ value of 101° C. The $T_{1/2}$ value is sometimes known as the softening temperature ($T_s$) or melting temperature ($T_m$). The glass transition temperatures ($T_g$) of the higher and lower viscosity (a') polymeric resins were 61° C. and 56° C. respectively, as measured by Differential Scanning Calorimetry as the second heat value at a 20° C./min scan rate. The (c') waxes used in the four black-colored dry foiling toners were WE-2 having a $T_m$ of 62° C., WE-3 having a $T_m$ of 72° C., M90 having a $T_m$ of 91° C., and Polywax™ 1000 having a $T_m$ of 115° C. The WE-2 and WE-3 products are ester-based waxes that were obtained from the NOF Corporation, while the M90 and Polywax™ 1000 products are polyethylene waxes that were obtained from the NuCera Solutions Corporation. These $T_m$ values are the peak values of the wax crystalline melting endotherms determined by Differential Scanning Calorimetry at 20° C./min. Also included within the dry black toner compositions were 2 weight % of a wax dispersant material obtained from the NuCera Solutions Corporation as DIAX L-775; 2 weight % of a charge control agent obtained from the Orient Chemicals Corporation as Bontron® E-84; 5.6 weight % of carbon black as the (b') pigment colorant from the Orion Carbon Corporation as NIPex® 60; and 1.3 weight % of a Pigment Blue 61 masterbatch with 40 weight % of Pigment Blue 61 and 60 weight % of the above noted lower viscosity (a') polyester resin, prepared by the Sun Chemical Corporation.

These ingredients were melt-blended for 10 minutes on a two-roll compounder set at 150° C. They were then pulverized to a dry toner particle size of approximately 6 μm on a conventional laboratory jet mill.

The series of four black-colored dry toners was tested for foil transfer properties as follows:

Patches (foiling toner latent images) of black-colored dry toner at 0.5 mg/cm$^2$ coverage were prepared by directly applying each to coated glossy paper of 118 g/m$^2$ weight used as a receiver material on a laboratory scale toning device. This device comprised a toning roller with a rotating magnetic core, and a transport device that translated the glossy paper over the toning roller loaded with a two-component developer comprising the sample black-colored dry foiling toner to be tested mixed with a conventional hard magnetic carrier material. The black-colored dry foiling toner coverage on the glossy paper was controlled by the level of the DC bias voltage applied to the toning roller. The black-colored foiling toner images (patches) were fused by contacting the back of the glossy paper with a hot "shoe" set at approximately 150° C. as the fusing temperature to provide black-colored fused toner images on the glossy paper surface.

The resulting black-colored fused foiling toner images were then taped to a sheet of 20 lb. bond paper such that a strip of each could be mounted next to each other so that all samples could be passed through a laminating device at the same time. The silver-colored printing foil to be tested was then taped across all four black-colored fused foiling toner images to be then passed through a laminating device described below. The silver-colored printing foil used was obtained from the Nobelus® Corporation, version LSSF.3.1260.00984. This printing foil is believed to be comprised of a polyethylene terephthalate support film having in order thereon, a release layer, the silver-colored metallized layer, and an adhesive layer. The support film side of the silver-colored printing foil was contacted by a heated roller of the laminating device, while the adhesive layer side was brought into proximity with the black-colored fused foiling toner images on the glossy paper that contacted the non-heated pressure roller. The laminating device (including fuser) used in this Example 1 was built from components of a fuser assembly taken out of an Ektaprint 300 copier that was commercially available from Eastman Kodak Co.

A printing foil transfer test was devised. This test comprised sending separate sets of the black-colored fused toner images just described through the laminating device at different heated roller temperatures at a transport speed of 1 m/min. After allowing the resulting heated and laminated structure to cool, the printing foil was pulled from each black-colored fused toner image on the glossy paper (receiver material) and the "degree of transfer" of the silver-colored removable portion of the printing foil was visually assessed on a scale of 0% to 100% transfer. The desired outcome is to be able to formulate dry foiling toners such that at a given temperature there will be 100% transfer to a fused foiling toner image and 0% transfer to a fused color toner image produced with dry color toners that are not designed to be "adhesive" dry foiling toners. In commercial practice, the dry foiling toner can be formulated with or without a pigment colorant as desired.

FIG. 1 describes the results of the foregoing test using the four black-colored dry toners described above. It can be seen from those results that the temperature required to provide 100% foil transfer was increased as the melting temperature of the (c') wax component of the black-colored dry toner was increased. Using the WE-2 ester-based wax with a $T_m$ of 62° C. in an adhesive dry foiling toner and the Polywax™ 1000 polyethylene wax with a $T_m$ of 115° C. in a dry color toner provided an operating range where the printing foil was completely transferred as desired in foiling toner latent images but was not transferred in the color image areas.

It has been found that the speed of the laminating process has a large effect on the temperature required to transfer foil to a fused toner image. The nip width of the described laboratory laminating assembly was measured to be 4 mm, which is less than that present in commercial foiling laminators that typically have nip widths in the range of 2 times to 10 times this value, thus allowing the required printing foil transfer dwell times in the heated nip to be achieved at a faster speed.

Example 2

Example 2 describes the foil transfer properties of two dry magenta toners and a dry cyan toner. This example provides an evaluation of the foil transfer efficiency as a function of lamination temperature using a silver-colored printing foil to various dry toner images using either a magenta-colored toner or a cyan-colored toner formed on the surface of a representative receiver material in order to evaluate the best (c) waxes to be included in either dry foiling toners or dry color toners.

Two dry magenta-colored toners were prepared as comprising particles having a (a) polymeric resin that was a styrenic copolymer obtained from the Image Polymers Corporation as Almacryl® XPA7379, which has a $T_g$ of 67° C. and a $T_{1/2}$ (or $T_m$) of 133° C. Unlike the process described above in Example 1, the dry magenta-colored toners were prepared by melt compounding using a 30 mm twin screw extruder. Both dry magenta-colored toners comprised dry magenta toner particles comprising: a 50/50 mixture of PR122/PR185 magenta pigment colorants dispersed in an acrylic resin that was obtained from the Pan Technology Corporation; and the Bontron® E-84 charge control agent.

One of the dry magenta-colored toners comprised dry magenta-colored toner particles comprising 8 weight % of the ester-based wax WE-3 having a $T_m$ of 72° C. as described above in Example 1, while the second dry magenta-colored toner comprised dry magenta-colored toner particles comprising 3 weight % of a polyethylene wax having a $T_m$ of 131° C. that was obtained from NuCera Solutions as Polywax™ 3000. A wax dispersant was not included in these two dry magenta-colored toner formulations.

Figure 2:
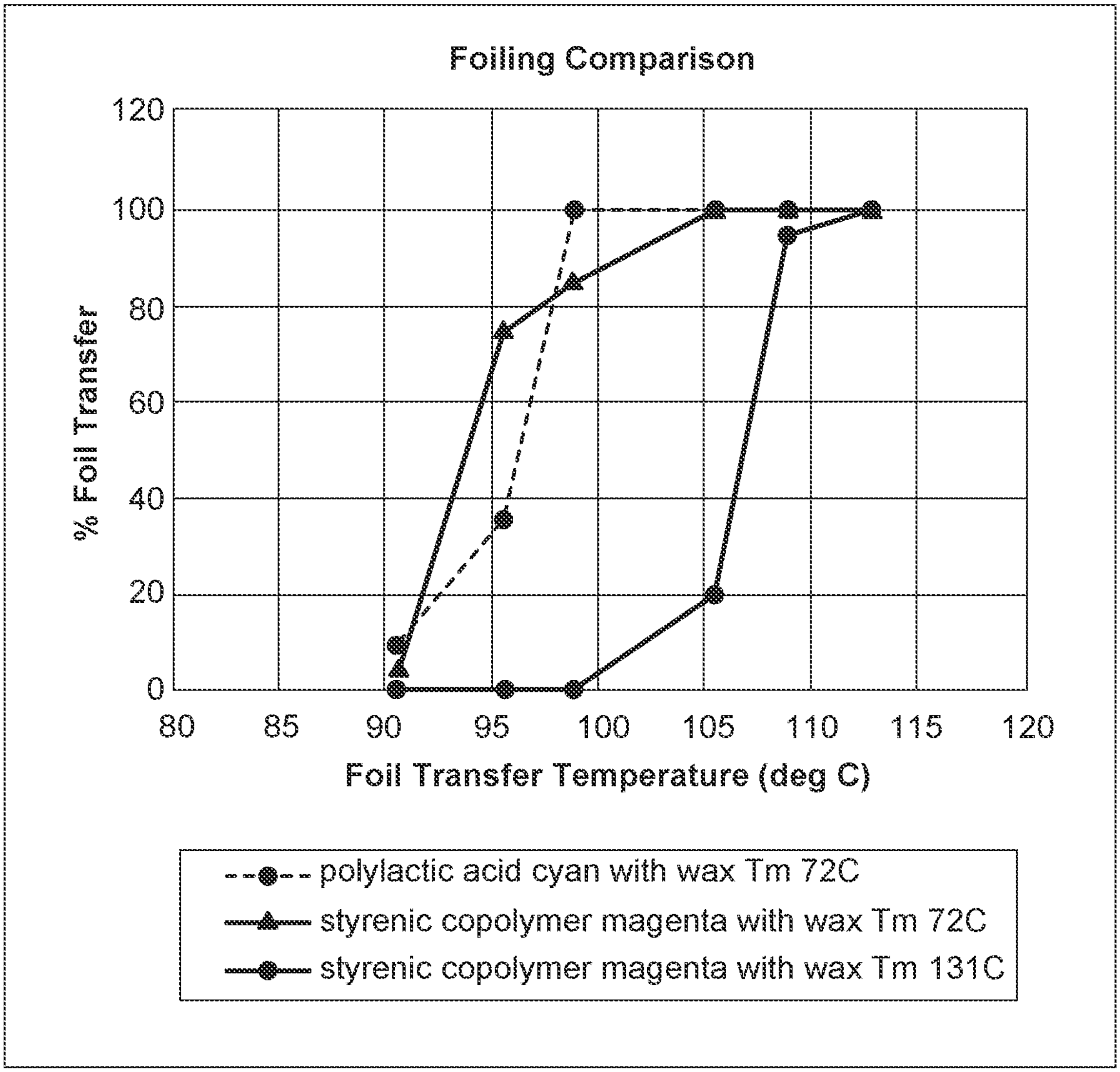
FIG. 2 is a graphical representation of data obtained according to Example 2 below, that is, % foil transfer versus foil transfer temperature using different (c) waxes in two dry magenta toners and a dry cyan toner.

A dry cyan-colored toner, described in FIG. 2, was prepared to comprise a (a) polymeric resin that is polylactic acid (PLA), a polyester that is different from the polyester that is described in FIG. 1. The PLA resin was obtained as amorphous grade Ingeo™ 6361D from Natureworks Corporation. It was pre-extruded at 350° C. in order to reduce the polymeric molecular weight to an appropriate amount to yield good fusing properties on a commercially available Kodak NexPress printer fuser that is operated in a fuser oil-free configuration, the extrusion resulting in a decrease of the PLA $T_g$ of from 55° C. to 51° C. In addition to the PLA, a cyan (b) pigment colorant was added as a dispersion in polyester resin of PB15:3 supplied by the Sun Chemical Corporation to provide dry cyan-colored toner particles. Thus, the dry cyan-colored toner comprised 6 weight % of the WE-3 ester-based wax described above.

This dry cyan-colored toner was prepared by a chemical process known in the art as evaporative limited coalescence (ELC) that is described in detail in U.S. Pat. No. 4,833,060 (Nair et al.), the disclosure of which toner forming process is incorporated herein by reference. This ELC method involves preparing an organic phase with ethyl acetate solvent including solubilized or dispersed toner components, which organic phase is then dispersed in an aqueous phase containing a silica stabilizer and pH buffer to form oil-in-water droplets. After the removal of the ethyl acetate solvent, the silica stabilizer is removed with aqueous KOH and the resulting polymeric toner particles are washed and dried. It is possible to control the shape of dry toner particles prepared by ELC through the use of shape control agents such as polyethyloxazoline that can be added to the aqueous phase and serves to form a skin while the toner particles are drying, resulting in greater surface area and increased shape. U.S. Pat. No. 9,029,431 (Nair et al.) describes useful shape control agents and the disclosure of which is herein incorporated herein by reference.

The foiling procedure used with the resulting dry magenta-colored toners and the dry cyan-colored toner was identical to that described above in Example 1. Comparing the behavior of the two dry magenta-colored toners, it can be seen that there was a large increase in the temperature at which the printing foil transferred to the toner images obtained using dry magenta-colored toner particles comprising Polywax™ 3000 wax having a $T_m$ of 131° C. compared to the printing foil transfer to the toner images obtained using the dry magenta-colored toner particles comprising the WE-3 ester-based wax having a $T_m$ of 72° C. It can be seen that Polywax™ 3000 wax having a $T_m$ of 131° C. is more suitable for use in dry color toners rather than in a dry foiling toner.

The dry cyan-colored toner comprising the PLA polymeric resin and WE-3 ester-based wax facilitated printing foil transfer at approximately the same temperatures as the dry magenta-colored toner particles comprising the styrenic copolymer and WE-3 ester-based wax. However, the temperature range for evaluating 0% to 100% printing foil transfer was desirably less when the dry cyan-colored toner was used. It can be seen that there is a temperature at which the dry cyan-colored toner comprised of the PLA polymeric resin and the wax having a $T_m$ of 72° C. can serve as a suitable dry foiling toner to facilitate 100% printing foil transfer in combination with 0% printing foil transfer to a color toner image, for example, like the dry magenta-colored toner described above comprising the Polywax™ 3000 wax. In this case, the described dry cyan-colored toner can be used as a as a dry foiling toner with the (c) wax melting temperature designated as $T_{foiling}$, and we can define the magenta-colored toner as a dry color toner having a wax with a melting temperature defined as $T_{color}$.

Example 3

This Example illustrates the effect of the polymeric resin glass transition on the printing foil transfer process. Dry cyan-colored toners were prepared using the laboratory technique described above in Example 1. All dry cyan-colored toner samples comprised dry cyan-colored toner particles comprising: the polyester resin blend described in Table 1; 8 weight % of Polywax™ 1000 wax; 2 weight % of DIAX L-775 wax dispersant (NuCera Solutions Corporation); 2 weight % of E-84 charge control agent (Orient Chemicals Corporation); and 11 weight % of a 40% masterbatch of PB15:3 cyan pigment colorant dispersed in 60 weight % polyester resin from the Sun Chemical Corporation. The various polymeric resins were all obtained from the Kao Corporation, and are shown in TABLE I below. The first seven cyan-colored toner samples comprised blends of high viscosity, high Tg resin G-135 with lower viscosity resins of varied Tg that are also described in TABLE I. The weight fraction of the polyester resin blends was adjusted so that the weighted average of the $T_{1/2}$ softening temperatures supplied by the resin vendor was 120° C. for six of the seven samples. This was not possible for Sample 2 dry cyan-colored toner that was blended to result in an overall resin of T/2125° C. The last four dry cyan-colored toners were prepared from single polymeric resins, also described in TABLE I. In TABLE I, the $T_g$ values of the dry cyan-colored toners are reported as the midpoint of the second heat in ° C. as measured on a differential scanning calorimeter.

As was described above in Example 1, cyan toner latent images were prepared on a receiver material (paper sheet) from each dry cyan-colored toner and run through a fuser-based laminating assembly to evaluate printing foil transfer using the same silver colored printing foil described above. The raw data collected consisted of subjectively judged % of foil transfer versus foiling temperature. Two values were taken from each curve: first the highest temperature at which there was no transfer of printing foil; and a second at the lowest temperature at which there was 100% transfer of printing foil. These values are tabulated in the following TABLE I. The experiment was run with 5° F. (or 2.8° C.) steps between laminating events. The temperatures reported in TABLE I are in ° C.

If a dry color toner composition required a high temperature at which printing foil did not transfer to it, when fused, it was considered useful as a dry color toner for purposes of the present invention, in that it did not attract printing foil at the usual laminating conditions. If a dry color toner composition required a low temperature at which the fused color toner image (patch) exhibits 100% printing foil transfer, it was considered a good "adhesive" dry foiling toner for purposes of the present invention. The difference between the "highest temperature that exhibited 0% printing foil transfer" for a fused color toner image versus the "lowest temperature that exhibited 100% of the foil transferred" for a fused foiling toner image represents the working laminating temperature range for those two different toners for the present invention.

It is seen in TABLE I, that dry cyan-colored toner samples 6, 8, and 9 exhibited the "highest temperature for 0% transfer of printing foil" at 104.4° C. (the highest of the set of dry cyan-colored toner samples), which means that the printing foil did start to transfer at the next higher test temperature of 107.2° C. These samples then are the best candidate resins or resin blends in TABLE I to be used in as the dry color toner (that is, not as a dry foiling toner). Dry cyan toner sample 11 had the lowest "lowest temperature to achieve 100% printing foil transfer" of the set at 98.9° C., meaning that the printing foil did not transfer to it completely at the next colder increment of temperature of 96.1° C. This is then the best candidate resin of the TABLE I variants to be used as a dry foiling toner. The latitude to use this particular dry foiling toner in combination with dry color toners of samples 6, 8, or 9 is thus 104.4° C. to 98.9° C. or 5.5° C. with the described printing foil and laminating conditions.

TABLE I also presents data for the "highest temperature with 0% printing foil transfer" and the "lowest temperature with 100% printing foil transfer" versus the glass transition temperature of the dry cyan-colored toner ($T_g$) in ° C. A distinct relationship is seen where the higher the $T_g$, the higher are both the highest temperature for 0% printing foil transfer and lowest temperature for 100% printing foil transfer. Thus, dry cyan-colored toners should comprise high $T_g$ (a) polymeric resins for dry color toners, and low $T_g$ (a') polymeric resins for dry foiling toners. There is some noise in the graphical plots that may be due to melt viscosity or adhesive effects due to polymeric resin acid value among the eleven dry cyan-colored toner samples that were tested.

From these results and those provided above in Examples 1 and 2, it appears that to maximize printing foil transfer latitude in order to practically accomplish the concept of simultaneously providing both a one-color to a four-color set of dry color toner images and dry foiling (or foil adhesive) toner images, including fusing the color toner images and the foiling toner images at the same time, followed by printing foil transfer with laminating temperature latitude, one should minimize both the $T_{foiling}$ of the (c') wax and the (a') polymeric resin $T_g$ of the dry foiling toner, and maximize both the (a) polymeric resin $T_g$ and the (c) wax $T_{color}$ of the dry color toners.

It is noted that not all dry toners necessarily require the use of a wax to function well in an electrophotographic printer. However, for the desired printing foil transfer application envisioned according to the present invention, the dry color toners require a (c) wax as described herein to operate in a fuser oil-free fusing mode since typical silicone fuser oil (release) fluid is known to prevent sticking of the printing foil to fused foiling toner images. Fuser oil-free fusing of fused color toner images requires a (c) wax in the dry color toner(s) that at least partially melts at fusing temperatures so as to create a low viscosity liquid splitable layer that functions as the release fluid. There are of course practical constraints on these parameters as these materials must function as dry color toners with properties such as toner or image keeping under hot and humid conditions, and fusing temperature latitude in the electrophotographic printer. For example, if the WE-3 wax described above having $T_m$ of 72° C. in Examples 1 and 2 is present in the dry color toner, none of the formulations shown so far are capable of being useful as a dry foiling toner to be used in combination thereof. The WE-3 wax is however known to provide good toner fusing latitude in terms of parameters such as image release from the fuser and hot offset latitude in fuser oil-free electrophotographic fusers. Thus normally one might want to use it if the printing foil transfer was not needed in the product. It is also known that once a polymeric resin $T_g$ gets to 50° C. or a lower temperature, and the wax $T_m$ is 60° C. or lower, where a portion of the wax is molten at 50° C., such a toner composition will tend to agglomerate in a bottle under hot storage conditions and printed images will brick or stick to each other under hot and humid conditions such as those experienced inside an automobile or delivery van parked in the sun in the summertime.

It should be noted that the width of the $T_m$ range of the ester-based waxes is much narrower than that of commercially available polyethylene waxes. For example, the thermogram for WE-2 wax generated by differential scanning calorimetry shows that melting starts at approximately 52° C. while the melting peak is at 62° C. For the polyethylene wax Polywax™ 500 (NuCera Corporation), melting starts at approximately 40° C. while the melting peak is at 81° C. NuCera also supplies a narrower melting polyethylene wax, "M80", that has a melting peak at 81° C. as well but starts melting at approximately 45° C. Although narrower than the melting range of the Polywax™ 500 wax, the ester-based waxes have a much narrower yet melting range. These observations strongly indicate the use of an ester-based wax in a dry foiling toner in order to increase printing foil transfer temperature latitude without endangering keeping of the foil images at high temperature conditions such as are commonly observed in warehouses. The ester-based waxes are not available with as high a $T_m$ as are the commercially available polyethylene waxes. For example, Polywax™ 3000 polyethylene wax starts melting at approximately 75° C. with a peak temperature at 132° C. This is a very broad melting temperature range, but its onset of melting at 75° C. will not cause image keeping issues in typical extremes for the storage of toner images. Thus, the polyethylene waxes described herein are best for dry color toners and color toner images but not for the dry foiling toners and foiling toner images.

Concerning the formulation of the dry color toners useful in the present invention, raising the (a) polymeric resin $T_g$ and the (c) wax $T_{color}$ to improve printing foil transfer latitude is limited by other factors required for a practical dry toner composition. High (a) polymeric resin $T_g$ causes the use of higher temperatures in the fuser operation that requires more electric power consumption and may limit how fast a fuser operation can operate and thus limit the output speed of the electrophotographic printer. High (c) wax $T_{color}$ causes the loss of utility as a release agent in a fuser oil-free fusing operation. The data shown herein suggest that a practical dry color toner can have a (a) polymeric resin $T_g$ in the range of 60° C. to 70° C. with the (c) wax $T_{color}$ in the range of 100° C. to 135° C.

For a dry foiling toner, the (a') polymeric resin $T_g$ in the range of 50° C. to 60° C. and the (c') wax $T_{foiling}$ in the range of 60° C. to 75° C. are desirable. If storage or keeping conditions can be specified for shipping conditions and use conditions of the electrophotographic printer, these values for the dry foiling toner might be decreased by perhaps 5° C. since the transfer of printing foil will prevent print keeping problems.

Printing foil transfer was then accomplished using the same separate laminating device used in Examples 1, 2, and 3.

Figure 3:
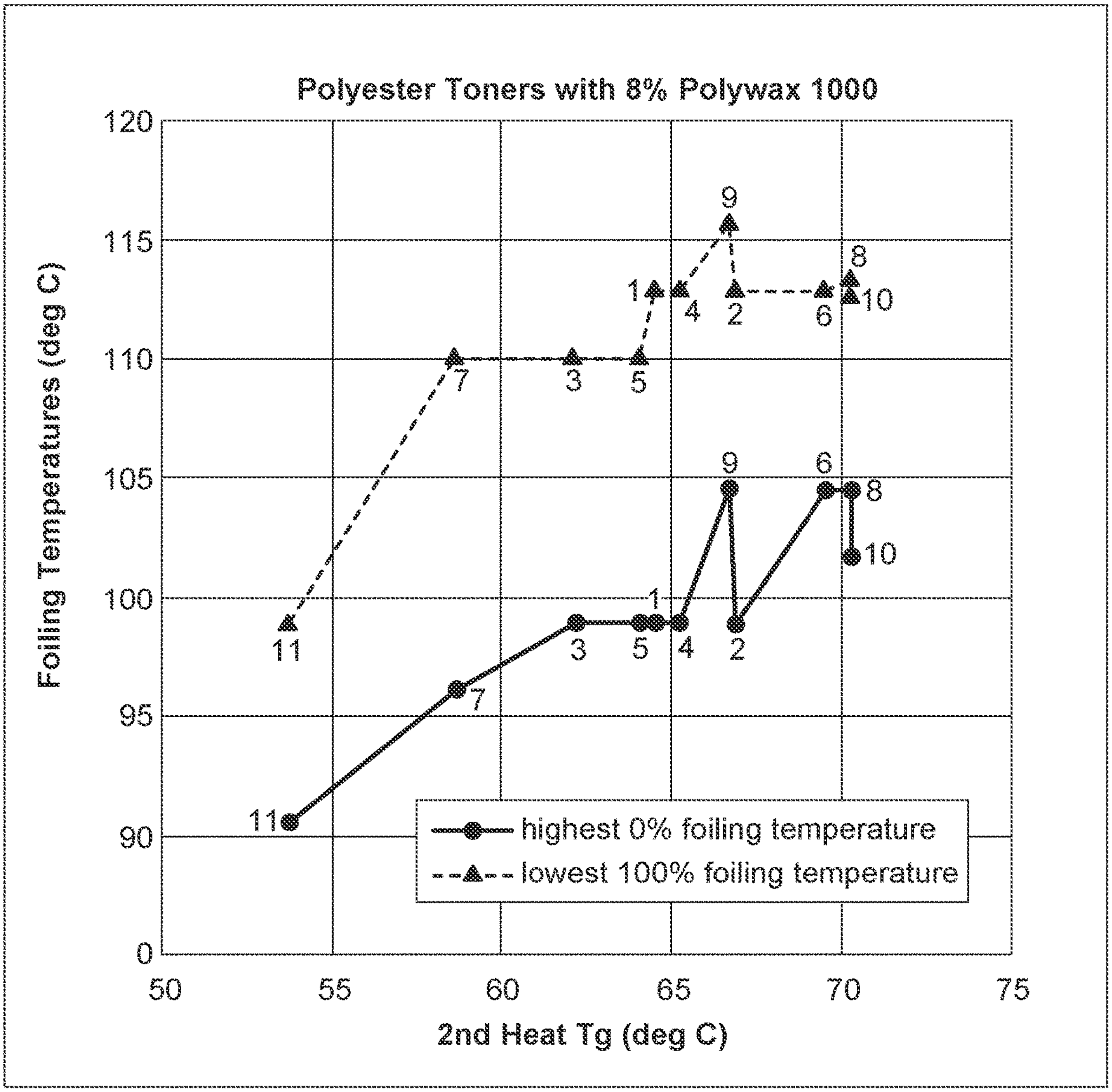
FIGS. 3 and 4 are graphical representations of the data obtained according to Example 4 below.

The data shown in FIG. 3 illustrate printing foil transfer versus foil transfer temperature for the same dry cyan-colored foiling toner described above in Example 2, and for the dry cyan, magenta, yellow and black dry color toners. All of these dry toners comprised particles comprising a styrenic copolymer resin obtained from the Image Polymers Corporation as the (a) polymeric resin and (a') polymeric resin, each having a $T_g$ of 63° C. and a $T_{1/2}$ of 141° C., CPR-390. The cyan, magenta, and yellow (b) pigment colorants were all obtained as Hostaprint® dispersions in a vinyl copolymer resin of PB15:3, PR122/PR185, and PY180, respectively, from Clariant Corporation. The dry black-color toner was prepared using NIPEX 60 carbon black as the (b) pigment colorant from Orion Engineered Carbons. The four dry color toners also each contained 3 weight % of Polywax™ 3000 ($T_{color}$ 131° C.) as the (c) wax, obtained from NuCera Solutions and 2 weight % Bontron® E-84 charge control agent obtained from Orient Corporation. The melt compounding was done using a 30 mm twin screw extruder. The four dry color toners were provided by grounding and were each then classified to approximately 6 μm volume median particle size. All of the dry color toner particles and the dry foiling toner particles were surface treated with 1 weight % R972 and 2 weight % NY50L silica, both obtained from the Evonik Corporation, and with 0.3 weight % 380M strontium titanate obtained from Esprix Technologies.

The color latent images and foiling toner latent images that were formed included 25%, 50%, 75% and 100% dry toner coverages, as well as bichrome mixtures of the dry cyan, magenta, and yellow toners (200% coverage areas). The receiver material used was 12 pt. coated glossy paper stock that was approximately three times thicker than that used in Inventive Examples 1, 2, and 3. The silver-colored printing foil used was the same as that used in Examples 1, 2, and 3 above, and the operating speed for foil transfer was again 1 m/min.

TABLE I

| | Resin Blends | | | | | | | Single Resins | | | |
|---|---|---|---|---|---|---|---|---|---|---|---|
| Sample | 1 | 2 | 3 | 4 | 5 | 6 | 7 | 8 | 9 | 10 | 11 |
| Resin 1 | G-135 | G-135 | G-135 | G-135 | G-135 | G-135 | G-135 | G-135 | | | |
| Resin 2 | X-1 | X-2 | X-3 | X-4 | X-5 | LLT-113 | NE-303 | | X-2 | LLT-113 | NE-303 |
| Fraction resin 2 | 0.67 | 0.67 | 0.56 | 0.585 | 0.55 | 0.675 | 0.45 | 0 | 100 | 100 | 100 |
| Resin $T_{1/2}$ ° C. | 120 | 125 | 120 | 120 | 120 | 120 | 120 | 135.5 | 119.8 | 112.6 | 101 |
| $T_g$ (° C.) | 64.5 | 66.9 | 62.1 | 65.2 | 64.1 | 69.5 | 58.6 | 70.3 | 66.7 | 70.3 | 53.7 |
| Highest Temp. 0% Foil Transfer ° C. | 98.9 | 98.9 | 98.9 | 98.9 | 98.9 | 104.4 | 96.1 | 104.4 | 104.4 | 101.7 | 90.6 |
| Lower Temp. 100% Foil Transfer ° C. | 112.8 | 112.8 | 110.0 | 112.8 | 110.0 | 112.8 | 110.0 | 112.8 | 115.6 | 112.8 | 98.9 |

Example 4

The data shown above in Examples 1, 2, and 3 were generated with images (patches) of all of the dry color toners and dry foiling toners being prepared on a small laboratory toning device (see for example, in Example 1). In this Example, color toner latent images and foiling latent images were provided on a surface of a receiver material and then fused on a commercially available Kodak NexPress printer in a single pass using a fuser oil-free fuser operation.

Figure 4:
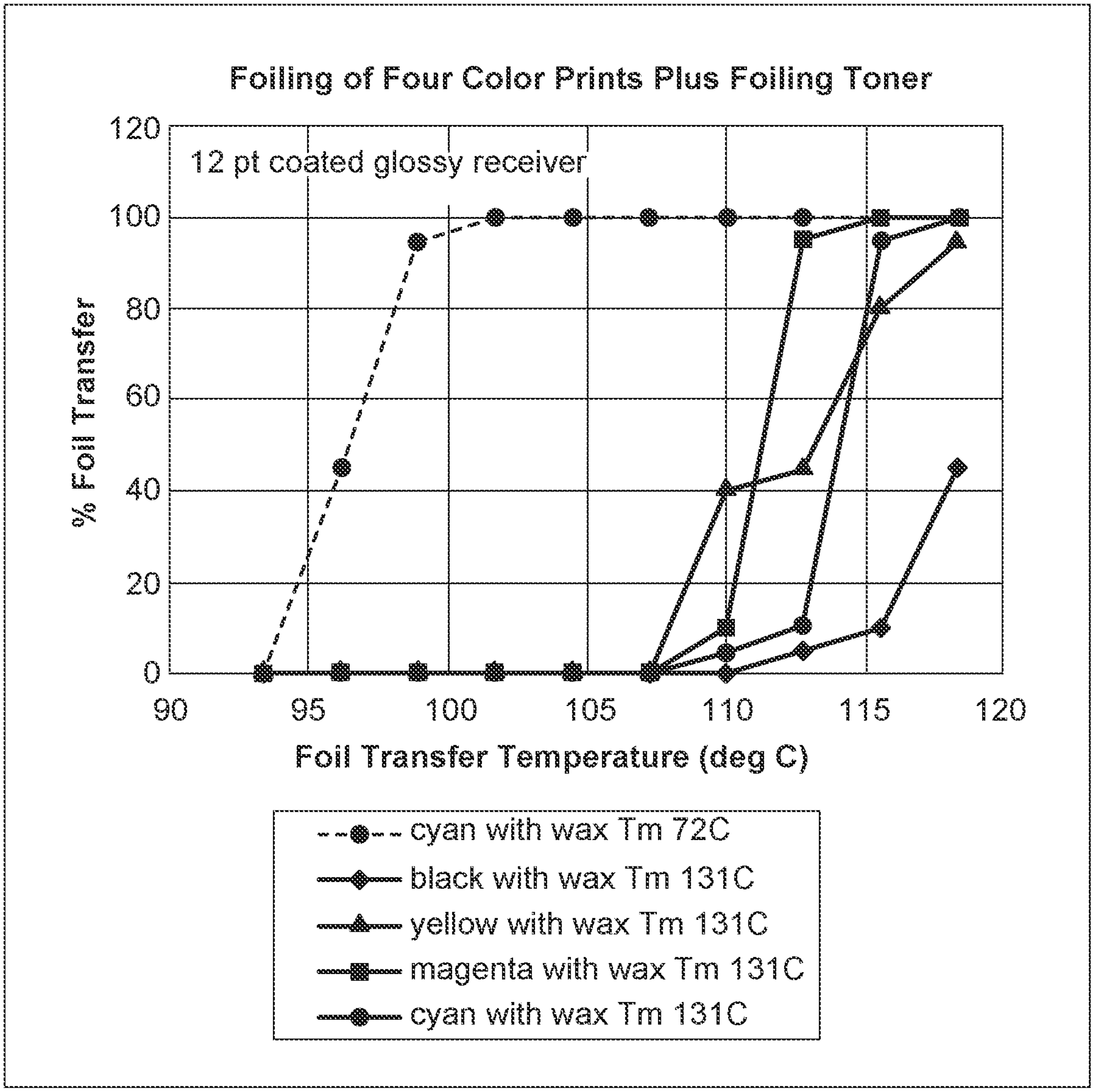

After fuser oil-free fusing, FIG. 4 shows the results of % foil transfer versus foil transfer temperature (° C.) for the 100% image areas of the five dry toners (dry color toner and dry foiling toner) used in the process. It can be seen there is approximately a range of operation of 102° C. to 107° C. where there was 100% foil transfer to the dry foiling toner (foiling image areas) with the lower $T_{foiling}$ (c') wax, and 0% foil transfer to any of the four dry color toners (color image areas). The 200% coverage color areas behaved similarly.

For this target the foiling toner image coverage did not overlap the color image area coverage.

Example 5

Example 5 illustrates commercially practical toner formulations that can be simultaneously imaged and fused in one step and then foiled using a printing foil in a second step without contamination of transferred foil on the color image areas and without missing foil transfer in foiling image areas. The same dry cyan, magenta, yellow, and black color toners described above in Example 4 were used in this Example 5. As in Example 2 and Example 4, the dry foiling toner was prepared using the ELC process and comprised particles composed of pre-extruded poly(lactic acid) (PLA) resin having a $T_g$ of 51° C. as the (a') polymeric resin, and 6 weight % of WE-3 (c') wax having $T_{foiling}$ of 72° C., and had a 6 μm median particle size. This dry foiling toner was also surface treated with the same surface formulation described above in Example 4. However, the (b') cyan pigment colorant was left out of the composition such that the dry foiling toner was essentially "clear" or colorless and was provided as a clear fused deposit after passing through an electrophotographic hot roller oil-less fuser.

The noted four dry color toners and the dry colorless foiling toner were printed using a commercially available Kodak NexPress electrophotographic printer on the same 12 pt. glossy coated paper as a receiver material described in Example 4. The various toner images were fused on an oil-less fuser installed in the NexPress printer. The resulting printed color toner images and foiling toner images included various types of engineering test targets as well as advertising style documents. Foiling image areas in the form of text areas were included. The silver-colored printing foil used in Examples 1 through 4 was not used. Instead, a "Sparkle" foil grade LSHR.3.1260.00984 printing foil obtained from the Nobelus® Corporation was utilized for the foiling operation. Lamination of the foiling image areas with the printing foil was carried out using a commercial laminator, that is a Komfi® Amiga 36 device manufactured by the Komfi Corporation and purchased from the Nobelus® Corporation, which was separate from the electrophotographic printer that was used to lay down various dry color toner and the dry foiling toner. The laminating device was operated at a speed of 2 m/min, which is twice the speed used on the laboratory fuser/laminator described for Examples 1-4.

With these materials and laminating conditions, it was observed that over a range of 82° C. to 87° C. of the laminator heater roller temperatures, foil images were produced where there was 100% transfer of the printing foil to the dry foiling toner having lower $T_{foiling}$ (c') wax and low $T_g$ (a') polymeric resin, and 0% transfer occurred to any of the four color image areas having the higher wax (c) $T_{color}$ and higher (a) polymeric resin $T_g$. It is noted that these temperatures are lower than the useful range observed with the laboratory fuser/laminator of 102° C. to 107° C. with materials of the same (c) and (c') wax $T_m$ and (a) and (a') polymer resin $T_g$ for both dry foiling toner and dry color toners in both examples.

The laboratory laminating device was measured to have a foil transfer nip width of 4 mm, while the foil transfer nip of the Komfi® Amiga 36 laminator was measured to be 14 mm. The nip widths and speed settings used for the Komfi® Amiga 36 resulted in a nip residence or dwell time of 0.42 sec versus that calculated for the laboratory laminating device of 0.24 sec. This greater time for heat transfer and materials flow helps to lower the temperature required in the foil transfer process. In addition. the Komfi® Amiga 36 laminator has a metal heater roller while the laboratory fuser/laminator has a rubber coating formulation that conducts heat more slowly than metal, further raising the heating roller surface temperature required for foil transfer.

The foiling image areas provided on the receiver materials in Example 5 using the dry colorless foiling toner displayed an image quality advantage over those foiling image areas described in Inventive Example 4 where the dry cyan-colored foiling toner was used. In Example 4 on a small scale, yet still visible to the naked eye, the printing foil did not completely transfer to all of the edges of each foiling image area, thereby leaving a slightly observable cyan ring around the silver-colored foiling image area despite the complete foil transfer to that foiling image area. There was no such ring visible when the dry foiling toner was clear and colorless. Raising the foil transfer temperature did not remove this effect. It is known in dry toner electrophotography that there are "satellite" toner particles around the edges of color image areas. For example, in normal printing of text using a dry black toner, black toner particles may not be seen as a ring around the color image area, but they can contribute to the perceived sharpness of the color image area. The commercial Eastman Kodak NexPress electrophotographic printer is generally acknowledged to provide color image areas that are sharp and have excellent readability even though it may exhibit satellite toner particles that are visible on the receiver material only under magnification.

Example 6

This Example illustrates the use of commercially practical dry toner formulations that were simultaneously imaged (printed) and fused in one step and then printing foil was transferred in a second step without contamination of printing foil on the color image areas and without missing areas of printing foil transfer within foiling image areas having the dry foiling toner. The same dry cyan, magenta, yellow, and black color toners described above in Inventive Examples 4 and 5 were used in this Example 6. The dry foiling toner however did not contain the WE-3 ester wax having $T_{foiling}$ of 72° C. and the PLA polymeric resin but it was composed of the WE-2 ester wax having a $T_{foiling}$ of 62° C. and a (a') polymeric resin blend of polyesters widely used in the dry toner industry. Like the dry foiling toner in Example 5, no (b') pigment colorant was present in the dry foiling toner that comprised a (a') polymeric resin having particles composed of: a 55/45 polyester mixture of a first polyester having a $T_m$ of 101° C. and a $T_g$ of 56° C. and a second resin having a $T_m$ of 145° C. and a $T_g$ of 61° C., both obtained from the Kao Corporation; 8 weight % WE-2 (c') wax obtained from the NOF corporation; 2 weight % of DIAX L-775 wax dispersant obtained from the NuCera Corporation; and 2 weight % of Bontron® E-84 charge control agent obtained from the Orient Corporation. The components were melt-mixed using a 30 mm extruder, ground, and classified to 6 μm median particle size. The resulting dry foiling toner was surface treated with the same surface formulation as described in Example 4. The images were fused to the paper receiver material in a Kodak NexPress printer equipped with an oil-less fuser.

Lamination of resulting foiling toner images with printing foil was carried out using a commercial laminator, a Komfi® Amiga 52 device manufactured by the Komfi® Corporation and purchased from the Nobelus® Corporation. This device had roller lengths longer than the Komfi® Amiga 36 used in Example 5 and was operated at a speed of 3 m/min instead of the 2 m/min employed with the earlier laminating device. The loading pressure applied to the lamination rollers was set at 6 bar (or, $6\times10^6$ dynes/$cm^2$). The silver-colored printing foil used in Examples 1-4 was used in this Example 6.

With these materials and laminating conditions, it was observed that over a range of 82° C. to 87° C. of the laminator heater roller temperature, the resulting foil images were produced where there was 100% printing foil transfer to the fused foiling image areas having the fused foiling toner having the lower $T_{foiling}$ (c') wax and $T_g$ (a') polymeric resin, and 0% printing foil transfer to any of the four color image areas having fused dry color toners composed of higher $T_{color}$ for the (c) wax and higher $T_g$ for the (a) polymeric resin.

The quality or completion of the printing foil transfer to the fused foiling toner areas was observed to be dependent on how the foiling image areas were prepared. Image files with the same overall visual design were prepared first with the dry foiling toner applied on top of underlying dry color toners, and second where areas of the color image areas that would have had dry foiling toner placed on top of them instead had these areas "knocked out" of the files such that the dry foiling toner was placed on paper (receiver material) instead of on the dry color toner. Especially where there was high coverage of dry color toners in the color image areas, it was observed that there could be a loss of some printing foil transfer efficiency when the dry foiling toner was placed on top of those color image areas. Conditions were found where there was no loss of printing foil transfer efficiency without the knockout included in the imaging files supplied to the electrophotographic printer, however these were confined to a heater roller temperature of 87° C. plus or minus approximately 1° C. The stated printing foil transfer latitude of 82° C. to 87° C. was determined with the knockout applied and is likely slightly larger since the increments of temperature employed that were relatively large at 2.5° C. The use of the knockout when preparing the digital files to be printed thus increased the robustness of the printing foil transfer process.

The invention has been described in detail with particular reference to certain preferred embodiments thereof, but it will be understood that variations and modifications can be affected within the spirit and scope of the invention.

The invention claimed is:

1. A method for providing a foil image on a receiver material without inkjet printing, the method comprising the following A) through D):

A) providing one or more color toner latent images in one or more color image areas on a surface of a receiver material, using corresponding one or more dry color toners, each corresponding dry color toner comprising dry toner particles comprising: a (a) polymeric resin, a (b) pigment colorant, and a (c) wax that has a crystalline melting temperature defined as $T_{color}$ that is the temperature at the peak of a melting endotherm or the temperature at the peak of a main peak of multiple melting endotherms of the (c) wax;

B) simultaneously with or subsequently to A), providing one or more foiling toner latent images in one or more foiling image areas on the surface of the receiving material, using a dry foiling toner comprising dry foiling toner particles comprising: a (a') polymeric resin and a (c') wax that has a crystalline melting temperature defined as $T_{foiling}$, that is the temperature at the peak of a melting endotherm or the temperature at the peak of a main peak of multiple melting endotherms of the (c') wax, wherein the one or more foiling image areas are different from the one or more color image areas, and $T_{foiling}$ is less than $T_{color}$ by at least 15° C., wherein all of the one or more color image areas in A) are different from all of the one or more foiling image areas;

C) simultaneously fixing the one or more color toner latent images and the one or more foiling toner latent images on the surface of the receiving material, in a fuser oil-free fusing operation, to provide one or more corresponding fused color toner images and one or more corresponding fused foiling toner images; and D) forming one or more foil images in the one or more foiling image areas and not in the one or more color image areas, by bringing a printing foil into intimate contact with the one or more corresponding fused foiling toner images at a foiling temperature (FT) that is greater than $T_{foiling}$ but less than $T_{color}$.

2. The method of claim 1, wherein $T_{color}$ is at least 90° C. and up to and including 150° C.

3. The method of claim 1, wherein $T_{foiling}$ is at least 55° C. and up to and including 90° C.

4. The method of claim 1, wherein FT is at least 65° C. and up to and including 145° C.

5. The method of claim 1, wherein each (a) polymeric resin of each dry color toner has a glass transition temperature ($T_g$) of at least 55° C. and up to and including 80° C.

6. The method of claim 1, wherein the (a') polymeric resin of the dry foiling toner has a glass transition temperature ($T_g$) of at least 45° C. and up to and including 70° C.

7. The method of claim 1, wherein the (a') polymeric resin has a $T_g$ that is less than the $T_g$ of each (a) polymeric resin by at least 5° C.

8. The method of claim 1, wherein the one or more corresponding dry color toners comprise at least dry cyan, yellow, magenta, and black toners.

9. The method of claim 1, wherein the a') polymeric resin has a $T_g$ that is less than the $T_g$ of each (a) polymeric resin by at least 10° C.

10. The method of claim 1, wherein the (a) polymeric resin comprises one or more resins selected from the group consisting of polyesters, styrenic-acrylic copolymers, and acrylic polymers.

11. The method of claim 1, wherein the (c) wax is selected from the group consisting of an ester-based wax or a polyethylene wax.

12. The method of claim 1, wherein the dry foiling toner is colorless.

13. The method of claim 1, wherein the (a') polymeric resin comprises one or more resins selected from the group consisting of polyesters and styrenic copolymers.

14. The method of claim 1, wherein $T_{foiling}$ is less than $T_{color}$ by at least 30° C.

15. The method of claim 1, wherein the printing foil comprises a composite of an organic polymer substrate having disposed thereon, in order from the organic polymer substrate, a release layer, a metallized layer, and an adhesive layer.

16. The method of claim 1, wherein:

$T_{foiling}$ is less than $T_{color}$ by at least 30° C.;

$T_{foiling}$ is at least 55° C. and up to and including 70° C.;

FT is at least 65° C. and up to and including 145° C.;

each (a) polymeric resin of each dry color toner has a glass transition temperature ($T_g$) of at least 55° C. and up to and including 80° C.;

the (a') polymeric resin of the dry foiling toner has a glass transition temperature ($T_g$) of at least 45° C. and up to and including 70° C.; and the (a') polymeric resin has a $T_g$ that is less than the $T_g$ of each (a) polymeric resin by at least 10° C.

17. An electrophotographic imaging method for providing an article having one or more foil images using toner latent images, the method comprising the following A') through E'):

A') developing one or more color toner latent images in one or more color image areas using corresponding dry color toners, to form a composite color toner image on an intermediate receiver material, each corresponding dry color toner comprising dry toner particles comprising: a (a) polymeric resin, a (b) pigment colorant, and a (c) wax that has a crystalline melting temperature defined as $T_{color}$ that is the temperature at the peak of a melting endotherm or the temperature at the peak of a main peak of multiple melting endotherms of the (c) wax;

B') simultaneously with or subsequently to A), developing one or more foiling toner latent images in one or more foiling image areas to provide one or more foiling toner images on the intermediate receiver material, using a dry foiling toner comprising dry foiling toner particles comprising: a (a') polymeric resin and a (c') wax that has a crystalline melting temperature defined as $T_{foiling}$ that is the temperature t the peak of a melting endotherm or the temperature at the peak of a main peak of multiple melting endotherms of the (c') wax, wherein the one or more foiling image areas are different from the one or more color image areas, and $T_{foiling}$ is less than $T_{color}$ by at least 30° C. wherein all the one or more color image areas in A') are different from all the one or more foiling image areas;

C') transferring the composite color toner image and the one or more foiling toner images from the intermediate receiver material to a final receiver material;

D') simultaneously fixing the transferred composite color toner image and the transferred one or more foiling toner images in a fuser oil-free fusing operation, to provide a corresponding fixed composite color toner image and one or more corresponding fixed foiling toner images; and E') forming one or more foil images in the one or more foiling toner images and not in the one or more color image areas, by bringing a printing foil into intimate contact with the one or more corresponding fixed foiling toner images at a foiling temperature (FT) that is greater than $T_{foiling}$ but less than $T_{color}$, to provide an article with one or more foil images and a composite color toner image.

18. The electrophotographic imaging method of claim 17, wherein A') and B') are carried out with the application of dry black toner, dry yellow toner, dry cyan toner, dry magenta toner, and dry foiling toner to the intermediate receiver material in the listed order from corresponding individual modules of an electrophotographic printing machine.

* * * * *